United States Patent [19]
Blinn et al.

[11] Patent Number: 5,897,622
[45] Date of Patent: Apr. 27, 1999

[54] ELECTRONIC SHOPPING AND MERCHANDISING SYSTEM

[75] Inventors: Arnold Blinn, Bellevue, Wash.; Michael Ari Cohen, San Francisco, Calif.; Michael Lorton; Gregory J. Stein, both of Redmond, Wash.

[73] Assignee: Microsoft Corporation, Redmond, Wash.

[21] Appl. No.: 08/732,012

[22] Filed: Oct. 16, 1996

[51] Int. Cl.⁶ .............................. G06F 17/60; G06F 13/00; G06F 15/16

[52] U.S. Cl. .................................. 705/26; 705/27; 707/3; 707/104; 707/501; 707/513

[58] Field of Search .................................. 705/26, 27, 30, 705/35, 39; 707/1, 2, 3, 4, 5, 6, 10, 100, 102, 103, 104, 501, 509, 513; 395/200.31, 200.33, 200.47, 200.49

[56] References Cited

U.S. PATENT DOCUMENTS

| | | | |
|---|---|---|---|
| 5,708,825 | 1/1998 | Sotomayor | 395/762 |
| 5,754,772 | 5/1998 | Leaf | 395/200.33 |
| 5,761,656 | 6/1998 | Ben-Shachar | 707/4 |
| 5,802,518 | 9/1998 | Karaev et al. | 707/9 |

OTHER PUBLICATIONS

Andraka; "Put Your Database on the Web"; *Data Based Advisor;* v14 n6; p. 12(3); Jun. 1996; Dialog: File 275, Acc#01941476.

Vaughan–Nichols; "Unleashing Databases on the Web—True Wealth and Power Belong to Those Who Control Information Access"; *NetGuide,* 1996; n307; p. 111; Jul. 1, 1996; Dialog: File 647, Acc#01097465.

Olympia; "Cold Fusion 1.5; Autobahn"; *DBMS;* v9 n8; p. 33(4); Jul. 1996; Dialog: File 275, Acc#01955956.

eShop Technology overview, Internet address: http://www.e-shop.com/corp/technology.html. This reference was copied from the Internet and printed in or about May 1996; the pages are dated Jan. 1, 1996.

eShop In The News—Recent Press Release, Internet address: http://www.eshop.com/corp/press.html. This reference was copied from the Internet and printed in or about May 1996; the pages are dated Jan. 1, 1996. Dates are listed for press releases of Nov. 7, 1995, Dec. 7, 1995 and Jan. 23, 1996.

*eShop*™ *Technology Merchant Manual,* Feb. 21, 1996. This document contains proprietary material subject to M.P.E.P. § 724.

*Primary Examiner*—Stephen R. Tkacs
*Attorney, Agent, or Firm*—Lee & Hayes, PLLC

[57] ABSTRACT

The present invention provides a merchant system for online shopping and merchandising. The merchant system architecture provides great flexibility for a merchant to adapt the merchant system to their existing business practices, promotions and databases. The merchant system includes a dynamic page generator, a configurable order processing module and a database module capable of retrieving data from the database without regard to its schema. The present invention enables merchants to create electronic orders which are easily adaptable for different sales situations. The order processing module includes multiple configurable stages to process a merchant's electronic orders. The merchant system is capable of generating pages dynamically using templates having embedded directives. The database module and the dynamic page generator allow merchants to modify their databases and page displays without having to reengineer the merchant system.

64 Claims, 18 Drawing Sheets

200
- 202 — [fetchrows product "get-product"]
- 204 — <table>
- 204 — <tr><th>Item<th>Price>
- 206 — [eachrow product]
- <tr>
- 210 — <td>[value product.sku]
- 212 — <td>[money product.list_price]
- 208 — [/eachrow]

220

Product_table

| SKU | List_price |
|---|---|
| GLOVE | 1225 |
| HAT | 1680 |

230

232
| Sku | String |
| List_price | Number |

234
| GLOVE | 1225 |

236
| HAT | 1680 |

240

| Item | Price |
|---|---|
| GLOVE | $12.25 |
| HAT | $16.80 |

Revised_product_table  ─ 252

| SKU | List_price | Description |
|---|---|---|
| GLOVE | 1225 | Nice leather gloves |
| HAT | 1680 | Woolly hat w/pom-pom |

260

```
Sku          String
List_price   Number
Description  String
```
─ 262

| GLOVE | 1225 | Nice leather gloves |
|---|---|---|
| HAT | 1680 | Woolly hat w/pom-pom |

270 ─┐

```
[fetchrows product "get-product"]
<table>
<tr><th>Item<th>Price> <th>Description    ── 272
[eachrow product]
<tr>
<td>[value product.sku]
<td>[money product.list_price]     282
<td>[value product.description]
[/eachrow]
```

274 — `<th>Description`
278 — `<td>[value product.sku]`
280 — `<td>[money product.list_price]`
276 — `[/eachrow]`

284 ─┐

| Item | Price | Description |
|---|---|---|
| GLOVE | $12.25 | Nice leather gloves |
| HAT | $16.80 | Woolly hat w/pom-pom |

*FIG. 7*

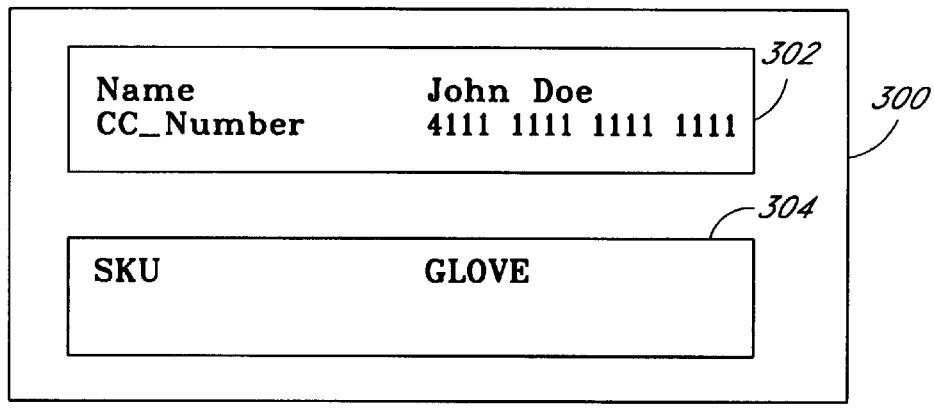
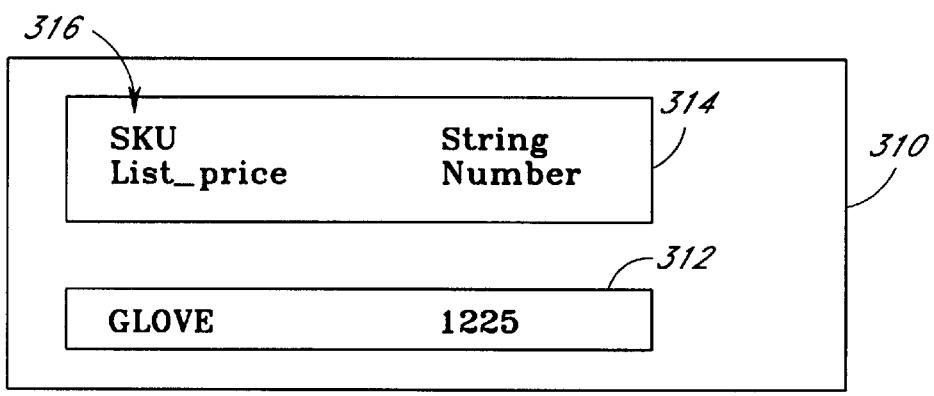
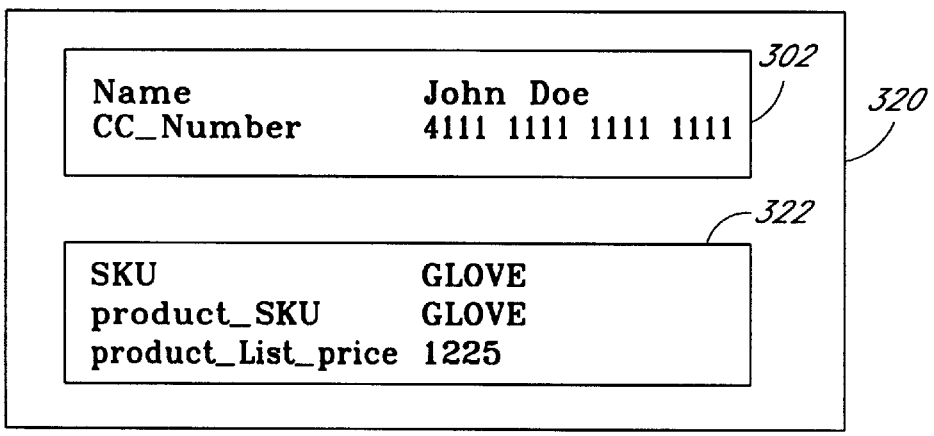
FIG. 9

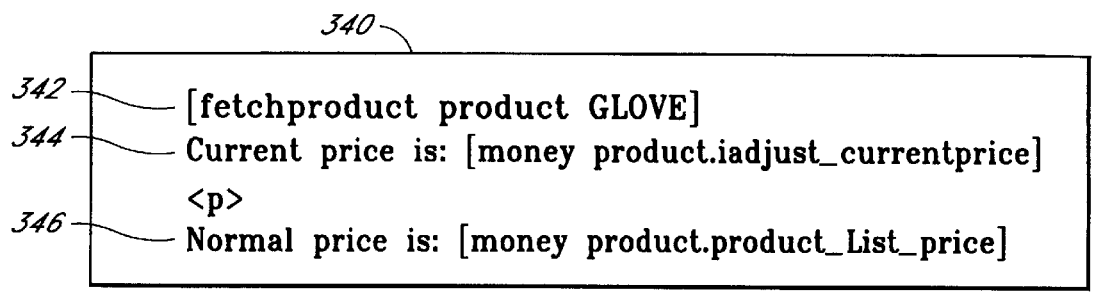
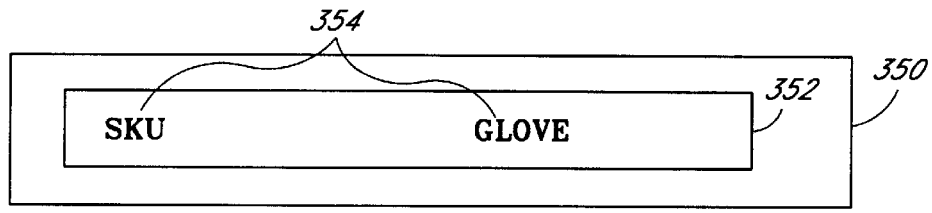
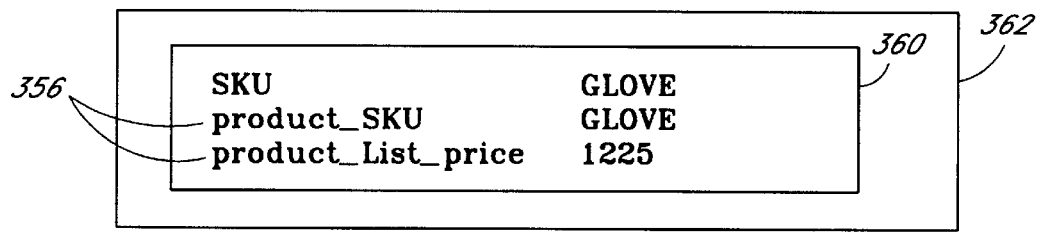
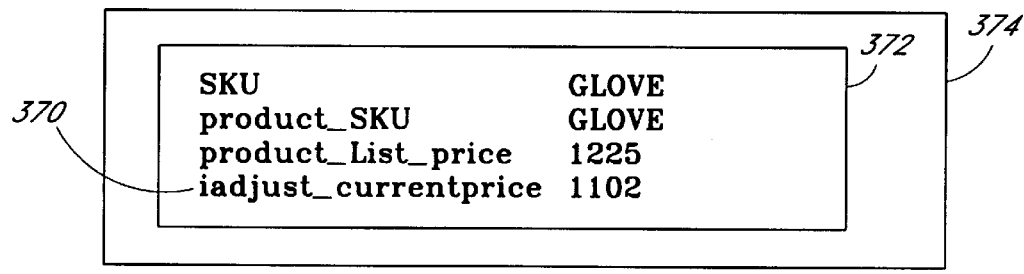
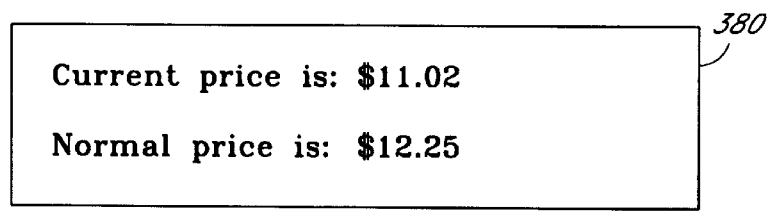
FIG. 11

```
402 — [fetchitems orderitems order.items]
404 — [eachrow orderitems]       410
408 — [fetchrows crossinfo cross orderitems.sku]
412 — [if crossinfo.count>0]  418                      419
414 — The item is a [value orderitems.sku] but try a [value crossinfo.related].
412 — [else]              417
416 — The item is a [value orderitems.sku] and has no related products.
412 — [/if]
406 — [/eachrow]
```
400
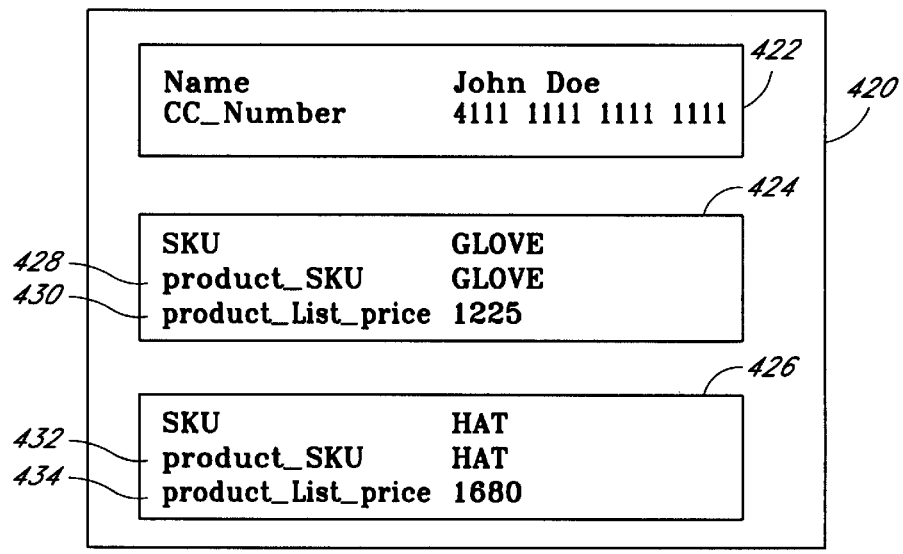
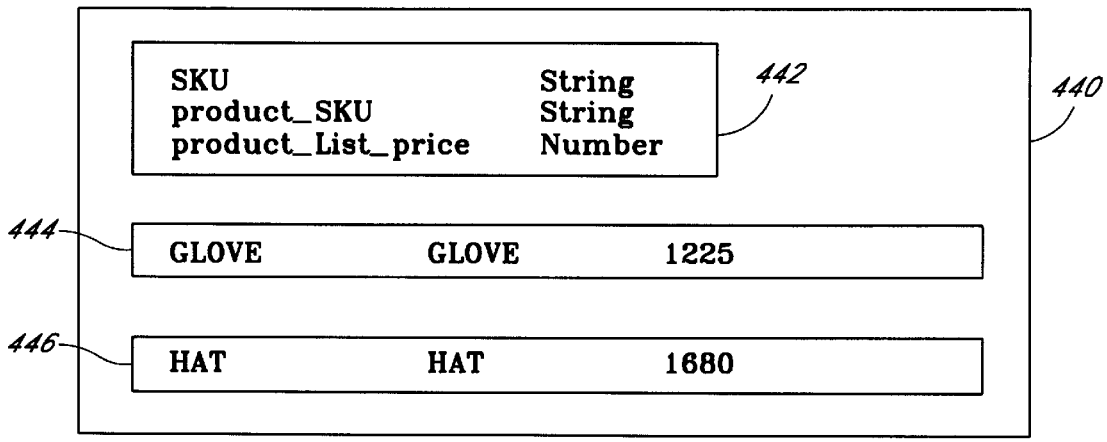
FIG. 13A 450 ⤸
Cross_table
| SKU | RELATED |
|---|---|
| HAT | SCARF |
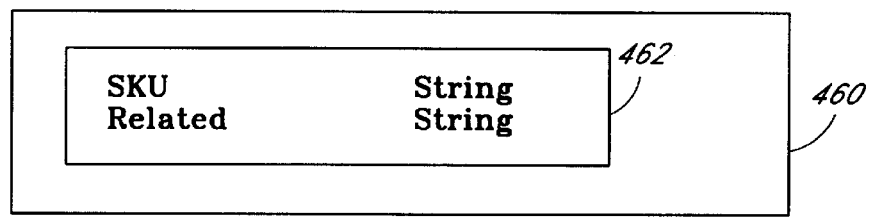
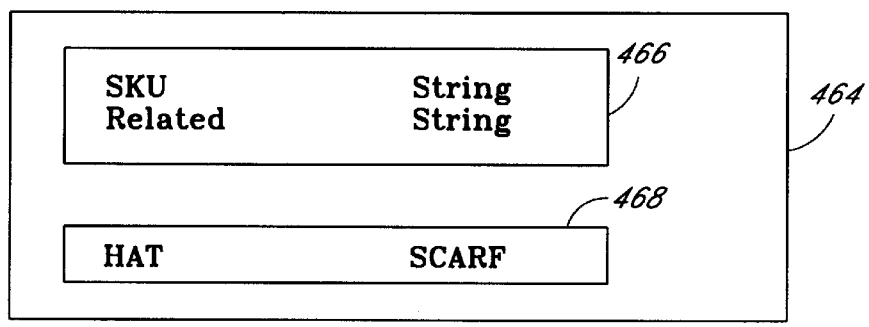
This item is a GLOVE and has no related products.
This item is a HAT but try a SCARF.
*FIG. 13B*

```
502 — order = load_order (shopper_id)
504 — add arguments to order
506 — OPM.plan(order)
508 — if order.error then
               DPG generate (error_template, order.error)
      else
510 —          issue_redirect (basket.html)
512 — save_order (order)
```

```
                                                        522
526   Name              John Doe
      CC_Number         4111 1111 1111 1111
      Billto_zip        92101

524
      SKU               GLOVE
```

```
      Name              John Doe
      CC_Number         4111 1111 1111 1111
      Bilto_zip         92101                           554
552 — _shipping_total   0
556 — _tax_total        77
558 — _total_total      1179

540   SKU                        GLOVE
546 — _product_SKU               GLOVE                  542
548 — _product_List_price        1225
550 — _iadjust_currentprice      1102
      _oadjust_adjustedprice     1102
```

*FIG. 15A*

570
- [fetchitems orderitems order.items]  — 572
- [eachrow orderitems]  — 574
- [fetchrows crossinfo cross orderitems.sku]  — 578, 580
- [if crossinfo.count>0]  — 582
- The item is a [value orderitems.sku] but try a [value crossinfo.related].  — 584
- [else]  — 582, 587
- The item is a [value orderitems.sku] and has no related products.  — 586
- [/if]  — 582
- [/eachrow]  — 576
- The shopper lives in the [value order.billto_zip] code.  — 588, 589

606

| | |
|---|---|
| Name | John Doe |
| CC_Number | 4111 1111 1111 1111 |
| Billto_zip | 92101 |

608

| | |
|---|---|
| SKU | GLOVE |
| product_SKU | GLOVE |
| product_List_price | 1225 |

604, 600, 602

610

| | |
|---|---|
| SKU | String |
| product_SKU | String |
| product_List_price | Number |

| | | |
|---|---|---|
| GLOVE | GLOVE | 1225 |

612

This item is a GLOVE and has no related products.
The shopper lives in the 92101 zip code.

ELECTRONIC SHOPPING AND MERCHANDISING SYSTEM

BACKGROUND OF THE INVENTION

1. Field of the Invention

The present invention relates to a shopping and merchandising system and, more specifically, to a shopping and merchandising system for online networks, such as the World Wide Web portion of the Internet.

2. Description of the Related Technology

The World Wide Web (Web) is part of a global computer network known as the Internet. Scientists and academicians initially developed and used the Internet to share information and collaborate. The Web functions as an object based multimedia system. It allows for the creation, storage and delivery of multimedia objects. Recently, on-line service providers, such as Microsoft Network, CompuServe, Prodigy and America Online, have linked to the Web. This enables their customers to access a variety of products and services available from independent content providers and other Web users. For example, a typical customer can access electronic mail, news services, travel services and online stores and malls on the Web.

The global penetration of the Internet provides merchants with the capability to merchandise their products to substantial shopping audiences using an online merchant system. Online merchant systems enable merchants to creatively display and describe their products to shoppers using Web pages. Merchants can layout and display Web pages having content, such as text, pictures, sound and video, using HyperText Markup Language (HTML). Web shoppers, in turn, access a merchant's Web page using a browser, such as Microsoft Explorer or Netscape Navigator, installed on a client connected to the Web through an online service provider, such as the Microsoft Network or America OnLine. The browser interprets the HTML to format and display the merchant's page for the shopper. The online merchant system likewise enables shoppers to browse through a merchant's store to identify products of interest, to obtain specific product information and to electronically purchase products after reviewing product information.

To promote their products, merchants often discount their products or have sales. Merchants can use a wide variety of discounting schemes to promote their products. For example, a merchant may offer volume discounts, such as buy two and get one free, or membership discounts where, for example frequent shoppers and AAA members get 10% off, or cross-sell incentives offering, for example, 50% off socks with a shoe purchase. Existing online merchant systems, such as Netscape Merchant System, support only date-based sale pricing, such as 20% off all shirts during the month of May. To enter the online shopping market, merchants desire an online merchant system that allows for a significantly wider variety of product discounting and sales schemes.

Similarly, existing online merchant systems, such as eShop 1.0, implement a generic purchase transaction model to capture the most common variations of a purchasing transaction. To complete a purchase transaction, a merchant sums up the prices of items, deducts applicable discounts, adds sales tax, receives payment and delivers the purchased items to the shopper. Although these basic steps are the same for many merchants, electronic commerce in a global environment imposes many variations to this basic model. For example, merchants generally have to include a shipping and handling fee for their online shoppers. Merchants may likewise have to include special taxes or fees, such as value added taxes or use fees, applicable only in certain countries or economic unions. In addition, merchants may issue their online customers private label credit or charge cards. Customer payment using these private label cards requires authorization through private networks, instead of commercial banking networks. Thus, it becomes apparent that to enter the online shopping market, merchants require an online merchant system that provides for substantial variations in the purchase transaction model.

Lastly, merchants typically store product data, such as product descriptions, prices and pictures, in relational databases. Online merchant systems, therefore, have to interface with merchant databases to access and display product information. Databases require a consistent structure, termed a schema, to organize and manage the information. In a relational database, the schema is a collection of tables. For each table, there is generally one schema to which it belongs. In an implementation of a relational database, a relation corresponds to a table having rows, where each row corresponds to a tuple, and columns, where each column corresponds to an attribute. From a practical standpoint, rows represent records of related data and columns identify individual data elements. A table defining a retailer's product line may, for example, have product names, product numbers (e.g., SKUs) and prices. Each row of this table holds data for a single product and each column holds a single attribute, such as a product name. The order in which the rows and columns appear in a table has no significance. In a relational database, one can add a new column to a table without having to modify older applications that access other columns in the table. Relational databases thus provide flexibility to accommodate changing needs. Once the schema is designed, a tool, known as a database management system (DBMS), is used to build the database and to operate on data within the database. The DBMS stores, retrieves and modifies data associated with the database and, to the extent possible, protects data from corruption and unauthorized access. Because each merchant organizes its product information differently, there is a large installed base of databases having a wide variety of database schemas for product information.

Available online merchant systems, such as eShop 1.0 and Netscape Merchant System, require merchants to organize their product information according to a predefined database schema. Hence, to use such systems, a merchant must either convert its existing databases to this predefined schema or the merchant must create a new database having the predefined schema. For many merchants, conversion of their existing databases is not feasible. For example, the merchant may have several hundred thousand product entries located in different remote databases accessed by legacy applications, such as a point of sale system or an inventory control system, specifically designed to interact with these different databases. If the merchant converted these databases to the predefined schemas, their legacy applications would no longer function properly. To protect their investment in legacy applications, merchants may have to copy their product data into a redundant database having the predefined schema. Otherwise, merchants may have to incur substantial costs to rewrite their legacy applications to support the predefined schema of the online merchant system. For these reasons, it is not cost-effective for a merchant to use applications requiring a predefined schema for existing relational databases. To enter the online shopping market, merchants require an online merchant system that will cooperatively function with existing database systems having a wide variety of schemas.

SUMMARY OF THE INVENTION

The present invention enables merchants to enter the online shopping market by providing a system and architecture to obtain and perform a large set of processing operations and computations on a rich set of dynamically generated information from a wide variety of data sources. In contrast to the rigid display formats and fixed database schemas of existing merchant systems, the present invention provides a dynamic page generator that permits the display of dynamically generated data in any format or presentation desired by the merchant. The present invention provides this flexibility through the use of display templates and a database schema independent query mechanism. In this manner, a merchant changes the display formats by modifying a template instead of revising the system modules producing the display formats. Similarly, a merchant handles database modifications by modifying the queries stored in the database instead of modifying the system modules performing the database queries.

In addition, the present invention enables a merchant to effectively promote their products. In contrast to existing merchant systems that separate display operations from processing operations, the present invention provides the capability to generate product information pages dynamically during order processing. Thus, a shopper using the present invention can view special promotion information during order processing operations. Similarly, the present invention uses the same calculations to display product information and to process an order, so a shopper is guaranteed consistency and reliability in the information used to make purchasing decisions. Moreover, the present invention provides a configurable order processing module that enables merchants to add components to the merchant system they need to address the particular requirements of their purchase transactions, such as special value added taxes or use fees.

Lastly, the present invention enables merchants to protect their investments in existing databases by providing a database schema independent query mechanism. The present invention provides for the storage of database queries in the database to isolate applications that access the database from differences in schemas and data sublanguages. Similarly, because of the database schema independence, the order processing module of the present invention does not require modification for each change to the database.

One aspect of the present invention includes a merchant system comprising a dynamic page generator to compose a page for display by processing a template having a database request for page data, and a database module, in communication with a database and with the dynamic page generator, to retrieve page data from the database and to communicate the page data to the dynamic page generator, wherein the retrieved page data corresponds to the database request and wherein the database module retrieves the data in a manner that is independent of any database schema.

Another aspect of the present invention includes a merchant system comprising an order processing module, a plurality of components associated with the order processing module so as to create and process an order, wherein a component makes a request for order data, and a database module, in communication with a database and with the order processing module, to retrieve order data from the database and to communicate the order data to the order processing module, wherein the retrieved order data corresponds to the request and wherein the database module retrieves the data in a manner that is independent of any database schema.

Yet another aspect of the present invention includes a merchant system comprising an order processing module having a plurality of components configured to create and process an order, and a dynamic page generator, in communication with the order processing module, to compose a page for display by processing a template having a request for information from the order.

Lastly, another aspect of the present invention includes a merchant system comprising an order processing module having a plurality of components configured to create and process an order, wherein a component makes a request for order data, a dynamic page generator, in communication with the order processing module, to compose a page for display by processing a template having a request for information from the order and a database request for page data, and a database module, in communication with a database and with the order processing module and with the dynamic page generator, to retrieve order data from the database and to communicate the order data to the order processing module and to retrieve page data from the database and to communicate the page data to the dynamic page generator, wherein the retrieved order data corresponds to the component request, the retrieved page data corresponds to the database request and the database module retrieves the order and page data in a manner that is independent of any database schema.

BRIEF DESCRIPTION OF THE DRAWINGS

FIG. 6 shows a portion of a template, a product table and an access object which illustrate an example of the data flow of FIG. 5 used to produce a HTML table for display.

FIG. 7 shows a revised portion of a template, a revised product table and an access object which illustrate an example of the data flow of FIG. 5 used to produce a HTML table for display.

FIG. 9 shows an order, an access object and an annotated order which illustrate an example of the data flow of FIG. 8.

FIG. 11 shows a template portion, an order, a first annotated order, a second annotated order and a page portion displayed on a consumer browser which illustrate an example of the data flow of FIG. 10.

FIG. 13a shows a template portion, an order and an access object which illustrate an example of the data flow of FIG. 12.

FIG. 13b shows a cross sell table, an access object having no data, an access object having one data row and a page portion which illustrate the data flow of FIG. 12.

FIG. 15a shows pseudo code for an action, an order and an annotated order which illustrate the data flow of FIG. 14.

FIG. 15b shows a template portion, an order, an access object and a page portion which illustrate the data flow of FIG. 14.

DETAILED DESCRIPTION OF THE PREFERRED EMBODIMENTS

For convenience, the description comprises the following sections:

I. Merchant System Overview
II. Templates, Directives and Actions
III. The Dynamic Page Generator
IV. The Order Processing Module
V. The Database Module
VI. Merchant System Data Flows and Architecture The following detailed description of the preferred embodiments presents a description of certain specific embodiments to assist in understanding the claims. However, one may practice the present invention in a multitude of different embodiments as defined and covered by the claims.

I. Merchant System Overview

Figure 1:
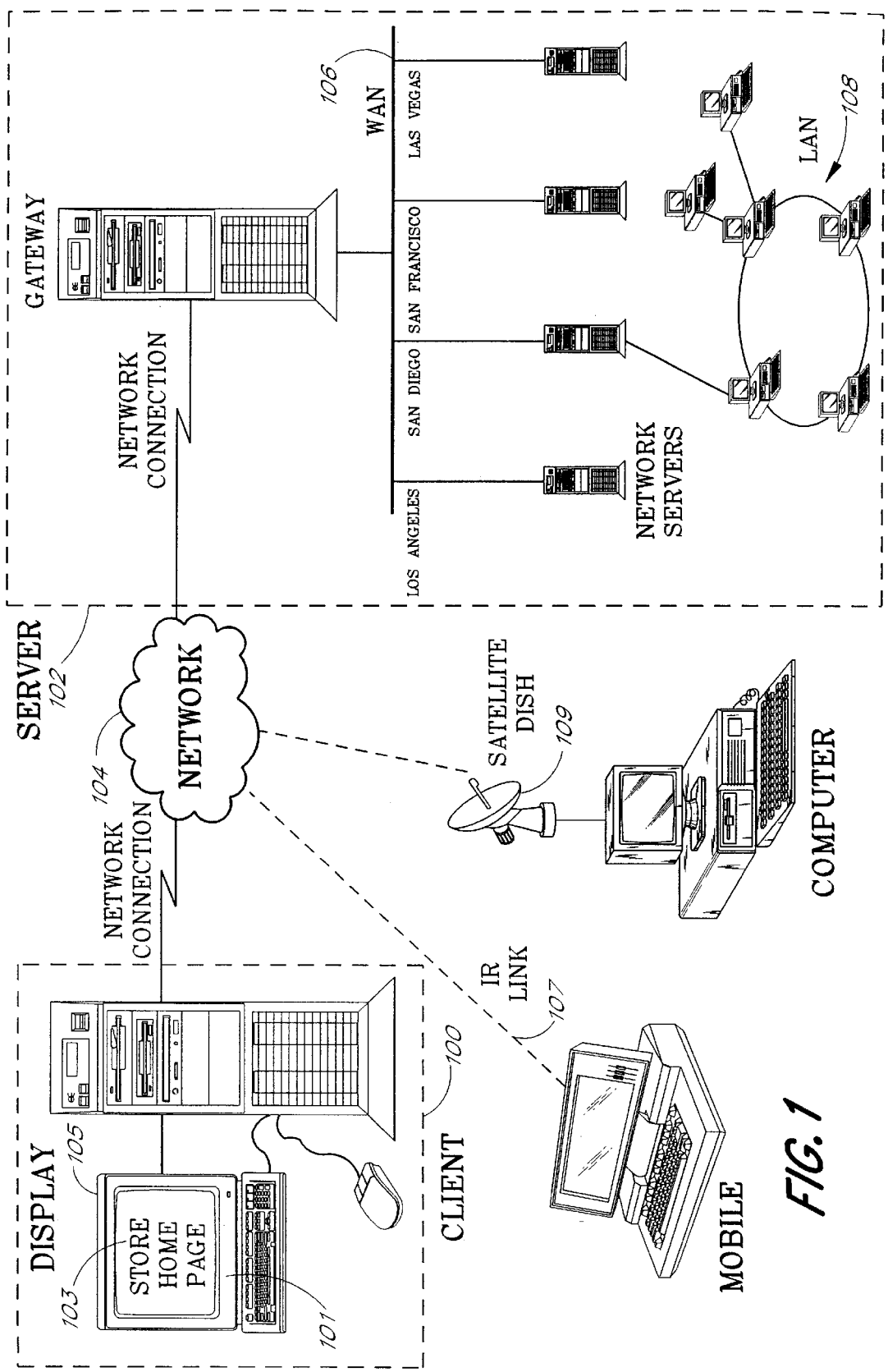
FIG. 1 is a block diagram illustrating an example of an online network for practicing the present invention.

FIG. 1 is an example of an online network for practicing the present invention. In particular, a client 100 communicates with a server 102 by means of a network 104, such as the World Wide Web portion of the Internet. The server 102 may include a gateway to a Wide Area Network (WAN) 106 having a plurality of Local Area Networks (LANs) 108. A browser 101, residing on the client 100, displays a store home page 103 retrieved from the World Wide Web on a viewing device 105. A user can view this page by entering, or selecting a link to, a Universal Resource Locator (URL), such as "www.store.com", in a browser program, such as Microsoft Explorer or Netscape Navigator, executing on the user's computer. Note that an online merchant system may reside in a server or in a combination of servers comprising the WAN 106. Similarly, the client 100 may access the network 104 through a wireless connection, such as the infrared link 107 or the satellite dish 109.

Focusing now on the network 104, the presently preferred network is the Internet. The structure of the Internet is well known to those of ordinary skill in the art and includes a network backbone with networks branching from the backbone. These branches, in turn, have networks branching from them, and so on. For a more detailed description of the structure and operation of the Internet, please refer to *"The Internet Complete Reference,"* by Harley Hahn and Rick Stout, published by McGraw-Hill, 1994. However, one may practice the present invention on a wide variety of communication networks. For example, the network 104 can include interactive television networks, telephone networks, wireless data transmission systems, two-way cable systems, customized computer networks, interactive kiosk networks and automatic teller machine networks.

In addition, the network 104 includes online service providers, such as Microsoft Network, America OnLine, Prodigy and CompuServe. In a preferred embodiment, the online service provider is a computer system which provides Internet access to a client 100. Customers pay monthly access fees to the online service providers for help services and access to the Internet through local telephone connections. Of course, the online service providers are optional, and in some cases, the clients 100 may have direct access to the Internet 104. For example, the client 100 may be connected to a local area network 108 which in turn is directly connected to the Internet 104.

Focusing now on the client 100, the client is a general purpose computer. In a preferred embodiment, the client 100 is a conventional personal computer equipped with an operating system supporting Internet communication protocols, such as Microsoft Windows 95 and Microsoft Windows NT, a browser, such as Microsoft Explorer or Netscape Navigator, to access the Merchant System and a conventional modem for access to the Internet 104. In other embodiments, the client 100 could, for example, be a computer workstation, a local area network of computers, an interactive television, an interactive kiosk, a personal digital assistant, an interactive wireless communications device or the like which can interact with the network. While the operating systems may differ in such systems, they will continue to provide the appropriate communications protocols needed to establish communication links with the network 104.

Figure 2:
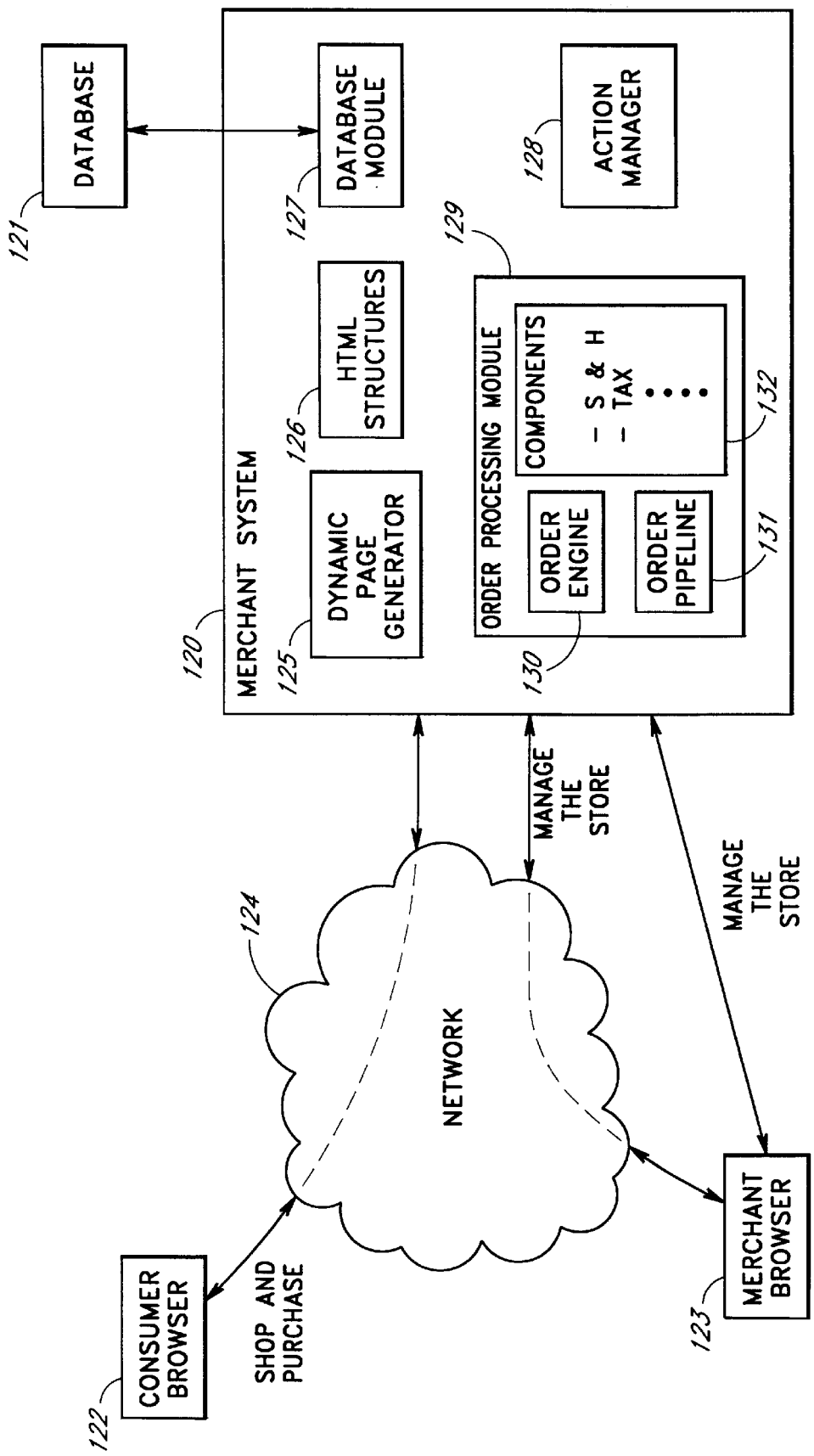
FIG. 2 is a block diagram illustrating the merchant system of the present invention.

Referring now to FIG. 2, a merchant system 120 communicates with a database 121, a consumer browser 122, a merchant browser 123, and a network 124. In a preferred embodiment, the database 121 comprises data stored locally in one or more storage devices, such as a magnetic disk drive or an optical disk drive. In another preferred embodiment, the database 121 comprises data distributed across a LAN 108 (FIG. 1) or a WAN 106 (FIG. 1). The database 121 may include query data, product information, order information, shopper information, store information, receipts and customer feedback data. A shopper uses a consumer browser 122, such as Microsoft Explorer or Netscape Navigator, communicating with a network 124, such as the World Wide Web portion of the Internet, to access a merchant's online store using the merchant system 120. Similarly, a merchant uses a merchant browser 123, such as Microsoft Explorer or Netscape Navigator, communicating with the merchant system 120 directly or through a network 124 to manage its online store. There are, of course, typically, a multiplicity of the browsers 122, 123 operating on the network 124 at any time.

Figure 14:
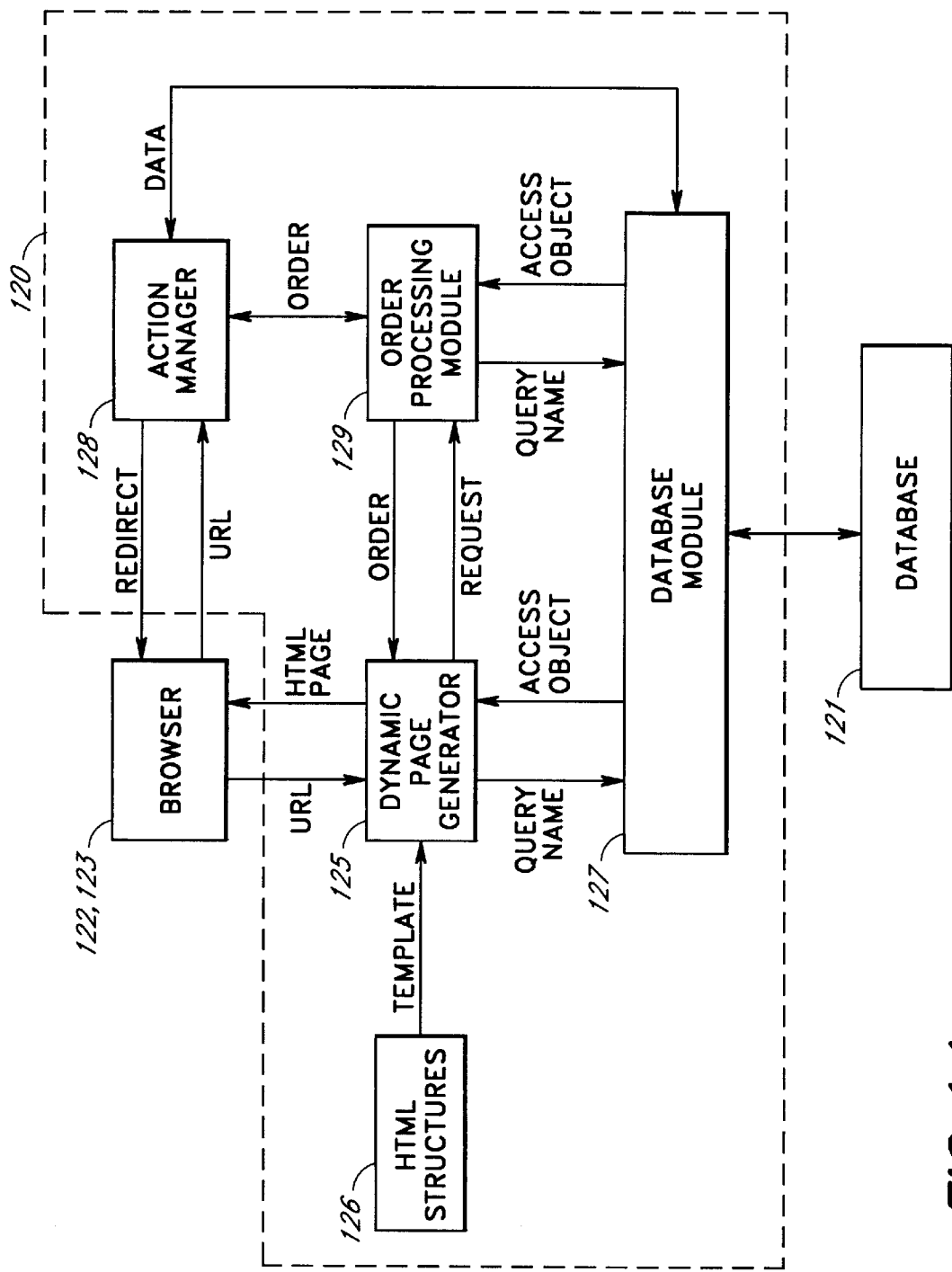
FIG. 14 illustrates the architecture of the merchant system of FIG. 2.

The merchant system 120 includes a dynamic page generator 125, HTML structures 126, a database module 127, an action manager 128, and an order processing module 129 having an order engine 130, an order pipeline 131, and components 132 for various purposes, such as calculating sales tax and shipping/handling fees. The dynamic page generator 125 uses HTML structures 126 and communicates with the database module 127 to access data from the database 121 to format and display on the consumer browser 122 and the merchant browser 123. The order processing module 129 communicates with the dynamic page generator 125 and the database module 127 to create Web pages having product information for display on a consumer browser 122. Similarly, the order processing module 129 communicates with the action manager 128 and the database module 127 as needed to execute purchasing transactions for the merchant's online store. Lastly, the order processing module 129 includes components 132, that is, a plurality of application programs to enhance and administer the merchant system 120. For example, the components 132 can include applications to interface with commercial banking systems, to calculate shipping/handling, to determine applicable taxes and to post payments to various bank accounts. The data communication internal to the merchant system 120 is shown in FIG. 14.

II. Templates, Directives and Actions

The following section discusses how the merchant system 120 uses templates, directives and actions to dynamically respond to customer requests. Templates, which include directives and actions, are located in the HTML structures 126. In response to browser requests, the dynamic page generator 125 composes HTML pages dynamically from templates stored in the HTML structures 126. In a preferred embodiment, the shopper invokes the dynamic page generator 125 by selecting a URL having the form:

"http://server_name/environment.security/pgen/store_name/shopper_id/template.htm1;arg1=value 1;arg2=value2 . . .".

The merchant system 120 interprets the URL by analyzing its constituents to identify a template and its arguments. Thus, the "http://" portion of the URL specifies use of the HyperText Transfer Protocol (HTTP) for communication across the Internet. The "server_name" portion of the URL specifies the name of the server having the router to the merchant's store. The "environment" portion of the URL describes the version of the merchant system used. For example, "prd" denotes a production version and "dev" denotes a development version of the merchant system 120. The "security" portion of the URL indicates whether the connection to the server is secure or insecure. Secure connections are specified with "s" and insecure with "i". The "pgen" portion invokes the dynamic page generator 125. The "store_name" portion indicates the name of the store, in addition to the directories where the template files reside. The "shopper_id" portion specifies the unique shopper identifier. Lastly, the "template.htm1" portion is the name of the HTML template to use to generate a page in response to the shopper's request and the "arg1=value1; arg2=value2 . . ." portion provides arguments for use by the dynamic page generator 125. Note that the specific URL format described above is for explanatory purposes only. Thus, other URL formats and locator techniques are included in the present invention.

A template defines the appearance of a page, such as the store home page 103 (FIG. 1), a product page or a customer information page. A portion of an example template is shown as 200 in FIG. 6. Templates include HTML and directives, which are keywords to the dynamic page generator 125 specifying how to build a page for display, such as what data to insert into the page and what queries to run against the database to obtain data for display on the page. A template may also include a wide variety of content, such as ActiveX controls, Visual Basic Scripts, forms, images, video and sound.

In a preferred embodiment, the merchant system 120 includes several predefined templates in the HTML structures 126. For example, a welcome.html page serves as a logon page for consumers. Similarly, a register.html page provides a form for a new consumer to enter registration information. An update.html page likewise provides a form for consumers to update their registration information. In addition, a mailn.html page presents an entrance to the store similar to a store lobby. The main.html page may include an index to store departments as well as links to important store information. Moreover, a dept.html page presents a list of store departments and a product.html page presents product information, such as an image and textual description. Lastly, a find.htrnl page, typically accessible from a navigation bar, provides a product search capability.

To support consumer purchases, the merchant system 120 includes a basket.html page having an interface that allows shoppers to manipulate items in their shopping baskets, the online equivalent of a shopping cart or handheld basket. Similarly, an orderfrm.html page provides an order form display for shoppers to select shipping methods and to provide delivery instructions for the order. A purchase.html page presents the order total and provides a form for entry of credit card payment information. To confirm purchases, a confirmed.html page presents a message confirming completion of the purchase transaction. Similarly, a receipt.html page presents a summary of the order in the form of an online checkout receipt. In addition, a detail.html page presents a detailed line item receipt for items ordered. Lastly, a receipts.html page presents receipts from all orders placed by a particular shopper.

Directives may include value references for evaluation during page generation. A value reference provides for evaluation of an expression, such as a string or function name, to a value prior to use in a page. For example, if the value reference is a number, say the cost of a product, it evaluates to the numerical value of the number. If the value reference is quoted text, such as "Glove", it likewise evaluates to the text within the quotes, or Glove. Similarly, if the value reference is a known function, say a function to calculate sales tax, the function evaluates to the value resulting from execution of the function. Note that arguments to functions are themselves value references and may be a constant, a parameter, a variable or even another function. Thus, value references are useful for performing mathematical calculations, retrieving data from database query results, storing and retrieving temporary variables, retrieving arguments and variables passed to a template and accessing shopper or order information.

Directives in a HTML template are set off by square brackets and may include value references as arguments. Thus, directives take the form [directive args], where directive is the name of the directive and args are arguments for the directive. For examples of directives, see the fetchrows 202, eachrow 206, value 210 and money 212 directives of FIG. 6. Using value references, the dynamic page generator 125 evaluates arguments of a directive before running the directive. Thus, value references may be used as variables for a directive. Directives affect the dynamic page generator 125 in three ways. First, a directive may generate text, such as HTML, formatted text and the contents of another file, for inclusion into the page. Second, the directive may perform a conditional test, similar to the standard if-then-else statement in many computer programming languages, for the inclusion or exclusion of text. Lastly, the directive may produce new value references for later use in page generation.

The merchant system 120 includes several types of directives. For example, value display directives generate text for inclusion on a HTML page. Typically, value display directives serve to format and display values, such as currency, dates, time and text. See directives 210, 212 in FIG. 6, for instance. Similarly, as noted above, conditional directives may include or exclude text in a page depending on the truth of a conditional statement. In addition, navigational directives result in selectable links or regions in a Web page that can take a shopper to another generated page or template. The merchant system 120 also includes database access directives. A database access directive typically selects and executes a database query to obtain query results having desired information. The dynamic page generator 125 then manipulates the query results to format and display the desired information. See directive 202 in FIG. 6, for instance. Similarly, order, product and receipt directives retrieve orders, receipts, product or shopper data for use in displaying order information. Lastly, convenience directives produce new value references for later use and generally facilitate page design and development. For example, convenience directives can include files in real-time, set variables, affect the status of a checkbox and provide comments to a template that are removed during page generation. Detailed information on the syntax of all directives supported by the merchant system 120 is found in the Microsoft Merchant Server Documentation, hereby incorporated by reference.

To perform various system operations, the merchant system 120 uses actions. For example, actions can add an item to an order form, clear an order from, initiate a purchase or insert and delete data from the database. An action is a routine to perform specific functions. Actions have return values that control the display of results to a shopper. Similarly, actions take arguments that control their behavior. Some actions generate errors when they receive incorrect arguments while other actions process and validate the arguments they receive. Many action arguments have default values to use when no values are specified. After execution of an action and its resulting system operation, the action may cause display of a HTML page having information, such as confirmation information or error information resulting from execution of the action, or the action may redirect the shopper to a new HTML page. Actions are called when a shopper clicks on a URL, generated by a directive, having the form:

"http://server_name/environment.security/xt/store_name/shopper_id/module.action; arg1=value1; arg2=value2 . . .".

The action manager 128 interprets the URL by analyzing its constituents to extract the action and its arguments for execution. Thus, the "http://" portion of the URL specifies use of HTTP for communication across the Internet. The "server_name" portion of the URL specifies the name of the server having the router to the merchant's electronic store. The "environment" portion of the URL describes the version of the merchant system used. For example, "prd" denotes a production version of the merchant system 120. The "security" portion of the URL indicates whether the connection to the server is secure or insecure. Secure connections are specified with "s" and insecure with "i". The "xt" portion specifies the action manager 128. The "store_name" portion indicates the name of the store, in addition to the directories where the template files reside. The "shopper_id" portion specifies the unique shopper identifier. Lastly, the "module.action" portion identifies the action to execute and the "arg1=value1; arg2=value2 . . ." portion provides arguments and values for use by the action manager 128 to execute the action.

In a preferred embodiment, the merchant system 120 includes several types of actions. For example, shopper actions control all aspects of shopper registration and logging into a store. Administration actions accessible by the system administrator provide for management of the merchant system 120. Database actions enable the merchant to create pages to access the database to insert, delete and update database information. Lastly, purchasing actions provide for the creation and execution of a shopper's order. A detailed explanation of the invocation and processing of purchasing actions is provided in a commonly owned and concurrently filed application having the title "System and Method for Processing Electronic Order Forms", Ser. No. 08/732,205 hereby incorporated by reference. Detailed information on the syntax of shopper, administration and database actions supported by the merchant system 120 is found in the Microsoft Merchant Server Documentation.

III. The Dynamic Page Generator

During a shopping session, the consumer browser 122 sends requests embedded in URL addresses to the merchant system 120. The merchant system 120 responds to these embedded requests with HTML documents. The HTML documents may contain registration information, product offerings, promotional advertisements, orders and receipts. The page generator 125 composes the HTML documents sent to the consumer browser 122. The merchant system 120 provides a set of HTML pages dynamically generated from queries to a database 121 having store information, such as inventory data, advertising copy, product images, pricing, customer information and promotions.

Figure 3A:
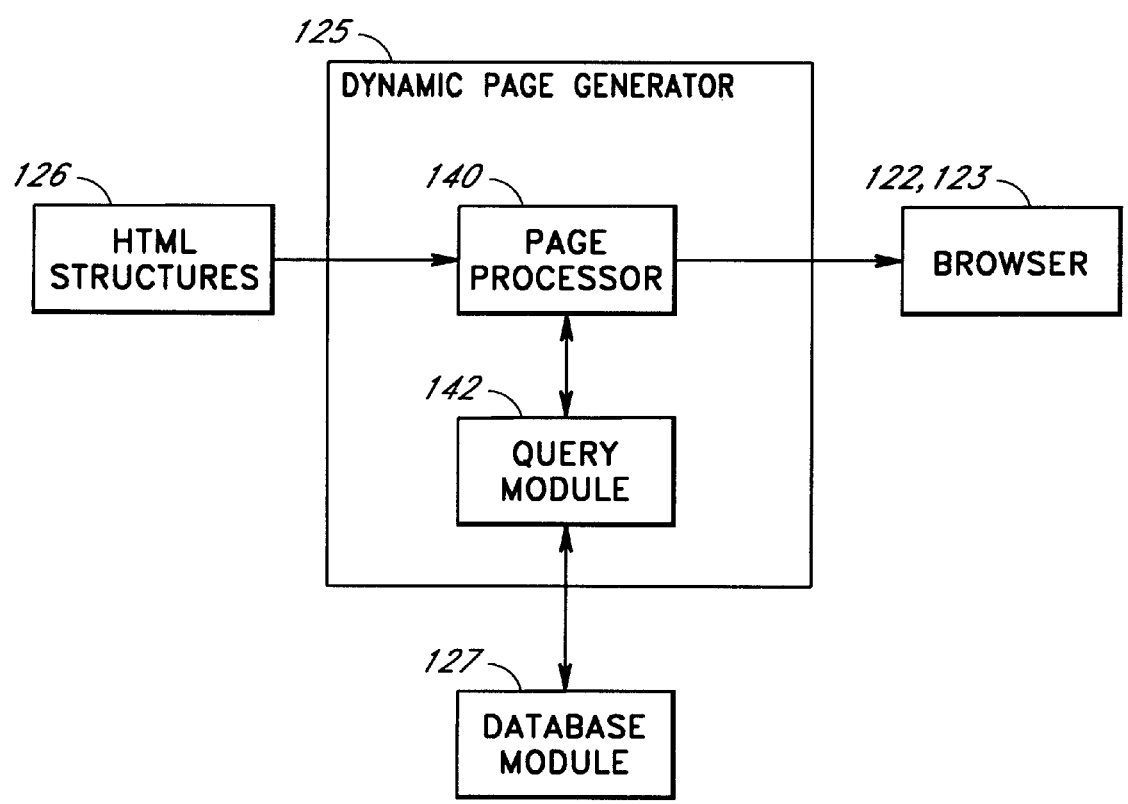
FIG. 3a is a block diagram illustrating the structure of a preferred embodiment of the dynamic page generator of FIG. 2.

FIG. 3a illustrates the structure of the dynamic page generator 125. In a preferred embodiment, the dynamic page generator 125 includes a page processor 140 and a query module 142. The page processor 140 retrieves and parses a template from the HTML structures 126 to form a HTML page for display on the browser 122, 123. In parsing the HTML template, the page processor 140 communicates with the query module 142 as needed to extract and format information from the database 121 to display on the browser 122, 123. Generally, the template provides a query name to the query module 142. In a preferred embodiment, the query module 142 passes this query name to the database module 127. The database module 127 uses the query name to retrieve the query from the database 121 and then passes the query to the database 121 for execution. In a preferred embodiment, the database 121 is a relational database that processes queries in the SQL data sublanguage. The database 121 in turn executes the query and returns the query results to the database module 127 to produce an access object having the query results. The database module 127 returns the access object having the query results to the query module 142. The page processor 140 obtains the access object from the query module 142 and processes the access object to extract and format the query data to prepare HTML for display on the browser 122, 123.

Figure 3B:
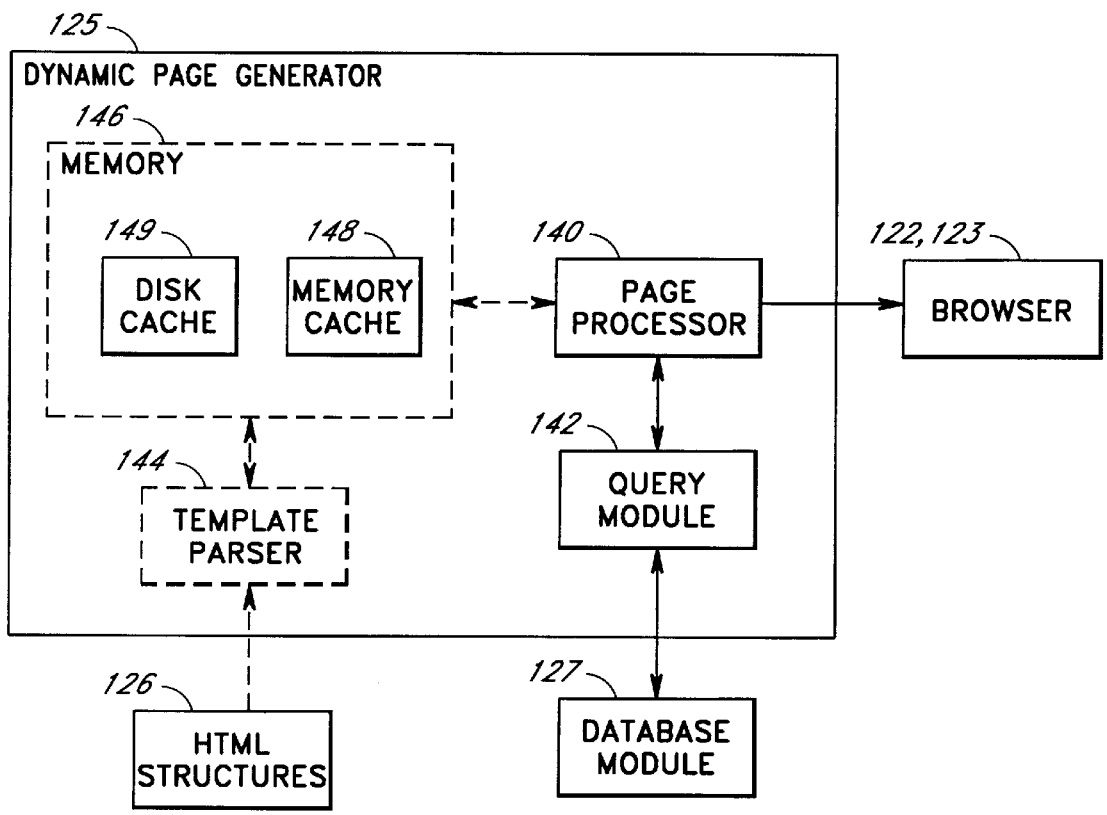
FIG. 3b is a block diagram illustrating the structure of another preferred embodiment of the dynamic page generator of FIG. 2.

Referring now to FIG. 3b, in another preferred embodiment, the dynamic page generator 125 includes a page processor 140, a query module 142 and a template parser 144. As before, the dynamic page generator builds a HTML page for display on a browser 122, 123 using templates. Similarly, the page processor 140 communicates with the query module 142 as needed to obtain, extract and format information from the database 121 for display on the browser 122, 123. However, in this preferred embodiment, the template parser 144 obtains a template from the HTML structures 126, parses this template to create a syntax tree and delivers the resulting syntax tree to the page processor 140 to create HTML for display on the browser 122, 123. As is well known in the art, a syntax tree is a common representation used in the construction of parsers and compilers to simplify the process of transforming an input file into a desired output. Thus, a syntax tree is an internal representation of the original input file. For more information on syntax trees, please refer to "*Compilers principles, techniques and tools*", by Alfred V. Aho, ISBN 0-201-10038-6.

Figure 4:
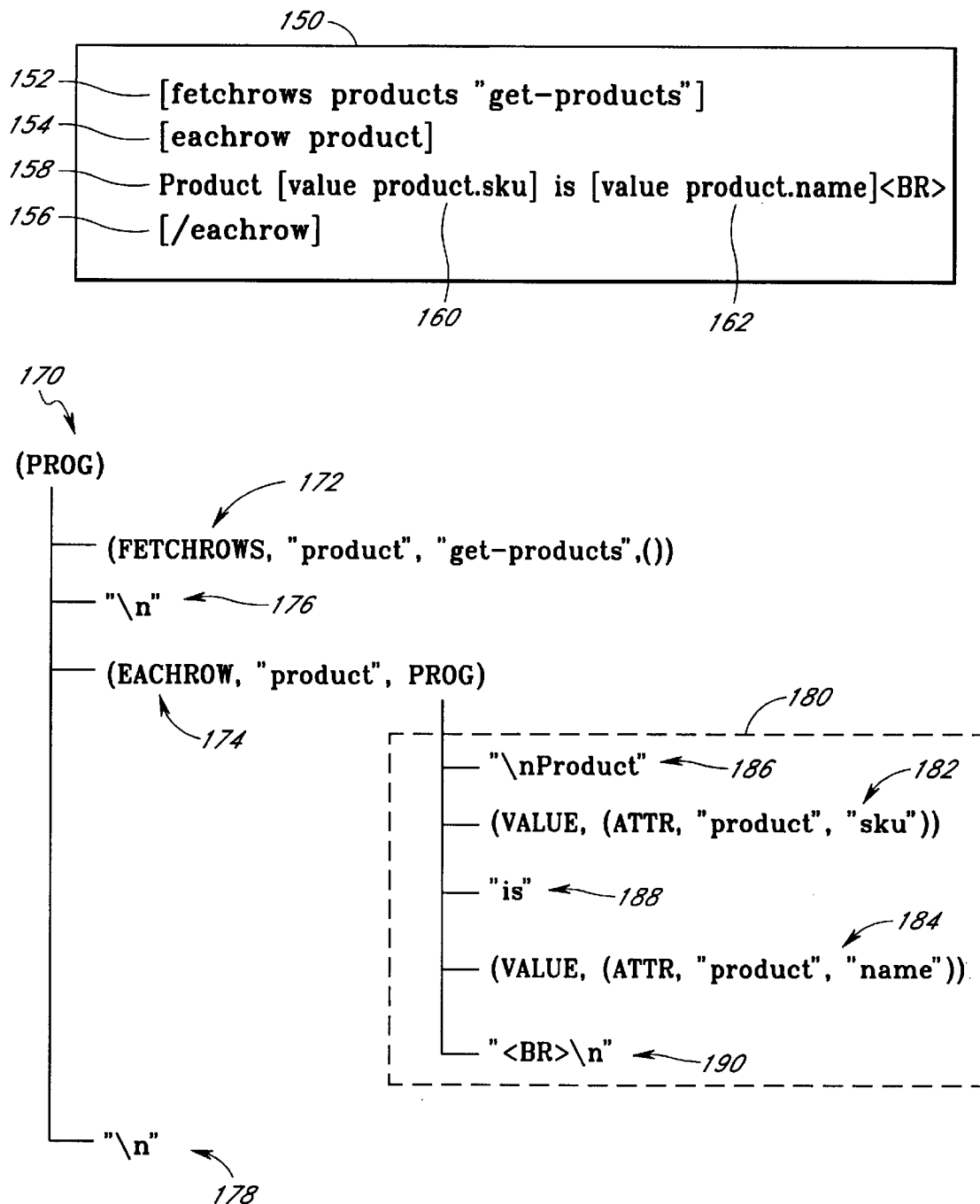
FIG. 4 illustrates the correspondence between -a syntax tree and a template used by the dynamic page generator of FIG. 3.

FIG. 4 illustrates a template portion 150 and a syntax tree 170 corresponding the template portion 150. To create the syntax tree 170, the template parser 144 parses the template portion 150 as follows. The template parser 144 converts the directive [fetchrows products "get-products"] 152 into a fetchrows branch 172 having a list "(FETCHROWS, "product", "get-products", () )" for use by the page processor 140 (FIG. 3b). The page processor 140 interprets the first item in the list of the fetchrows branch 172 as an instruction to perform and the remaining items in the list as parameters of the instruction. The template parser 144 next creates branch 176 for the carriage return at the end of the fetchrows directive 152 line in the template portion 150. The characters "\n" correspond to a carriage return in the C Programming Language. Similarly, the template parser 144 creates an eachrow branch 174 in the syntax tree 170 for the directive [eachrow product] 154. The directive [eachrow product] 154 initiates a loop to iterate through the rows of the "product" object. The directive [/eachrow] 156 denotes the end of the loop. Thus, the template parser 144 creates a sub-tree 180 under the eachrow branch 174 having branches corresponding to template instructions within the loop. Note that a parameter of an instruction in a list may itself be another list which, in turn, is processed to its actual value for use as the parameter. In some cases, the parameter may be evaluated multiple times. Referring back to the template portion 150, the loop includes a line 158 in the template portion 150 having directives [value product.sku] 160 and [value product.name] 162 to evaluate value references for "product.sku" and "product.name". Note that the template parser 144 creates a sku value branch 182 for the directive [value product.sku] 160 and a name value branch 184 for the directive [value product.name] 162 in the sub-tree 180. The template parser 144 likewise creates branches 186, 188, 190 in the sub-tree 180 corresponding to the HTML portions of line 158 and the carriage returns "\n". Lastly, the template parser 144 creates branche 178 in the syntax tree 170 with the character "\n" to indicate carriage return at the end of the line having the directive [/eachrow] 156.

In yet another preferred embodiment illustrated in FIG. 4, the dynamic page generator 125 includes a page processor 140, a query module 142, a template parser 144 and a memory 146. As noted previously, the dynamic page generator builds a HTML page for display on a browser 122, 123 using templates. As discussed above, the template parser 144 obtains a template from the HTML structures 126, parses this template to create a syntax tree and stores the resulting syntax tree in the memory 146. The memory 146 may include a memory cache 148, such as the dynamic random access memory (DRAM) or static random access memory (SRAM), and may include a disk cache 149, such as magnetic floppy disk storage and magnetic or optical hard disk storage, for storing syntax trees produced by the template parser 144. When a template is needed, the page processor 140 requests the template's syntax tree from the memory 146. If the requested syntax tree is present in the memory cache 148 or the disk cache 149, the memory 146 returns the requested syntax tree to the page processor 140. Otherwise, the memory 146 requests the syntax tree from the template parser 144.

The memory 146 provides for the efficient generation of HTML pages from templates by eliminating the need to parse the same template multiple times. For example, without the memory 146, if a shopper requests information on multiple products, the template parser 144 would have to create a syntax tree for the product.html template. Moreover, the dynamic page generator 125 can operate using a memory 146 having a memory cache 148 as well as a memory 146 having a disk cache 149 or even a memory having both a memory cache 148 and a disk cache 149. Note also that the addition of a memory cache 148 reduces retrieval time for the syntax tree as compared to a disk cache 149 operating alone due to the faster access of semiconductor memory. Lastly, the page processor 140 communicates with the query module 142 as needed to obtain, extract and format information from the database 121 for display on the browser 122, 123.

IV. The Order Processing Module

This section describes the order processing module 129 shown in FIGS. 2 and 14. In the preferred embodiment of FIG. 1, an order processing module 129 creates and processes an order. The order includes at least one order blackboard and one or more item blackboards. Preferably, each blackboard is an associative array having a key and a value for each key-value pair. A key is a string which uniquely identifies its associated value. To locate a particular value, a blackboard is searched for the proper key and returns the value associated with the key. In a preferred embodiment, the format of the order key-value pairs is "order.key" and the format of the item key-value pairs is "item.key". For example, the key for an item's SKU is referenced as "item.sku", where "item" identifies the item blackboard and "sku" identifies the sku key-value pair. The key-value pairs in the order blackboard contain order properties, such as the order date, the consumer's name, the consumer's address, the desired shipping address, the billing information, the order subtotal, the taxes, and the order total. Key-value pairs in item blackboards have information about each item. For example, the key-value pairs in an item blackboard may have item information such as the item's stock keeping unit (sku), an item description, the item color, the item size, the item price and the quantity of items. Preferably, an item blackboard exists for each item. Moreover, the key-value pairs in one item blackboard can differ from the key-value pairs in another item blackboard.

With reference to FIG. 2, the order processing module 129 includes an order engine 130 and an order pipeline 131 having multiple stages to process an order. Each stage has one or more components which process the key-value pairs in the order. The order engine 130 determines which components in the order pipeline 131 process the order. Each component in the order pipeline 131 reads from or writes to its assigned key-value pairs. Upon receiving an order, a component searches for its assigned key-value pairs and adds its own key-value pairs as needed to process the order. Thus, each component only modifies its assigned key-value pairs. This allows a merchant to add new key-value pairs without having to also modify the software instructions in other existing order processing components. Similarly, merchants may customize the merchant system 120 for different sales situations by merely modifying an existing component, replacing an existing component with a new component, or adding a new component. A detailed explanation of the order processing module 129 is provided in a commonly owned and concurrently filed application having the title "System and Method for Processing Electronic Order Forms", Ser. No. 08/732,205, previously incorporated by reference.

V. The Database Module

This section describes the database module 127 shown in FIGS. 2 and 14. The database module 127 provides an interface and a method for accessing data in existing databases 121 having a wide variety of schemas. In the merchant system 120, database queries are stored in the database 121 to isolate applications that access the database, such as the dynamic page generator 125 and the order processing module 129, from differences in schemas and data sublanguages, such as SQL. By storing queries as database data, changes to the database and differences in database query languages are transparent to applications using the database. Thus, a merchant does not have to modify its applications every time the merchant modifies the database.

The database module 127 references a specific query stored in the database 121 by a query name. Upon receipt of the query name, the database module 127 retrieves the specific query corresponding to the query name and returns this query to the database 121 for execution. Upon execution of the specific query, the database 121 returns the query results to the database module 127 to form an access object having the query results. The database module 127 then delivers the access object to the application for further processing.

In this manner, applications such as the dynamic page generator 125 and the order processing module 129 can retrieve information from a large installed base of databases 121 having a wide variety of schemas without regard to its schema. A detailed explanation of the method and interface for accessing data without regard to the database schema and the database module 127 is provided in a commonly owned and concurrently filed application having the title "Database Schema Independence", Ser. No. 08/732,013 hereby incorporated by reference.

VI. Merchant System Data Flows and Architecture

Figure 5:
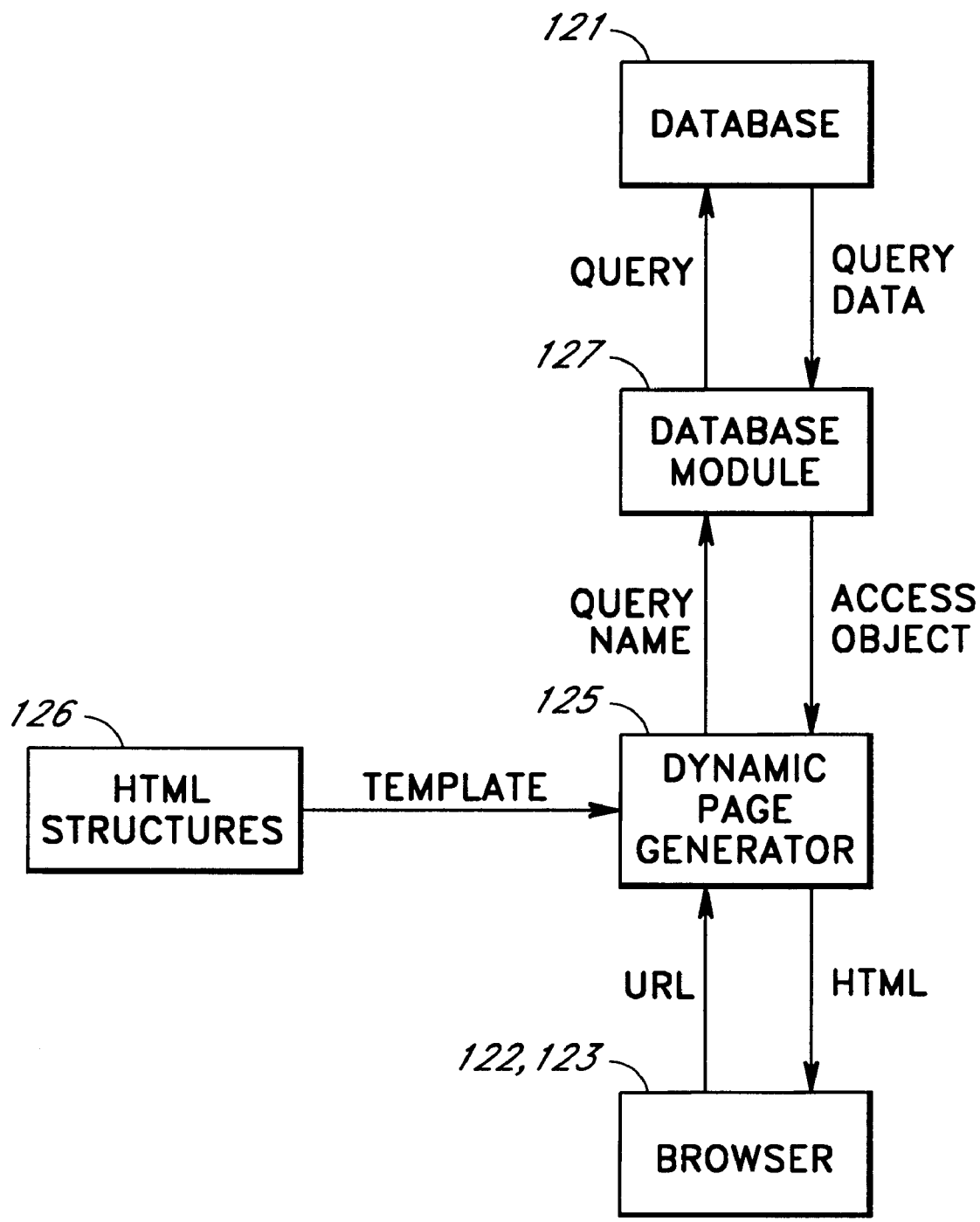
FIG. 5 illustrates the data flow for the database module and the dynamic page generator shown in FIG. 2.

FIG. 5 illustrates the data flow for the database module 127 and the dynamic page generator 125. In particular, when a shopper or merchant selects a button or link in a page, the browser 122, 123 returns a URL to the merchant system 120. As discussed above, a URL with a reference to "pgen" invokes the dynamic page generator 125. The dynamic page generator 125 extracts a template name, "template.html", from the URL and retrieves the template.html file from the HTML structures 126. When the template requires data from the database 121, the dynamic page generator 125 passes a query name to the database module 127. The database module 127 uses the query name to retrieve the query from the database 121 and then passes the query to the database 121 for execution. The database 121 in turn executes the query and returns the query results to the database module 127 to produce an access object having the query results. The database module 127 returns the access object having the query results to the dynamic page generator 125. The dynamic page generator 125 then processes the access object to extract and format the desired query results in HTML for display on the browser 122, 123.

For example, a template portion 200 includes the HTML and directives shown in FIG. 6. The directive [fetchrows product "get-product"] 202 instructs the dynamic page generator 125 to retrieve and execute the query named "get-product" on the database 121. In a preferred embodiment, the "get-product" query is the SQL query "SELECT * FROM Product_table" and the database 121 is a relational database having product information in a Product_table 220. The dynamic page generator 125 passes the name "get-product" to the database module 127 which retrieves the SQL query "SELECT * FROM Product_table" and passes it to the database 121 for execution. The database 121 returns the "get-product" query results to the database module 127 to incorporate into an access object 230 with a temporary name "product" for other directives in the template to reference. The product access object 230 includes a descriptor 232, a first row 234 and a second row 236. The HTML commands 204 instruct the browser 122, 123 to create and display a table having columns titled "Item" and "Price". The directive [eachrow product] 206 instructs the dynamic page generator 125 to initiate a loop to iterate through the rows of the product access object 230, one row at a time. The directive [/eachrow] 208 denotes the end of an iteration of the loop. Thus, the directive [value product.sku] 210 evaluates the product.sku value reference and places the value into the current page. Similarly, the directive [money product.list_price] 212 evaluates the product.list_price value reference, formats it as currency and places the formatted value into the current page for display. For example, for the first row 234 of the product access object 230, the directive [value product.sku] 210 evaluates to "GLOVE" and the directive [money product.list_price] 212 evaluates to "$12.25". At the completion of the [eachrow product] 206 directive, the dynamic page generator 125 passes a HTML file portion to the browser 122, 123 to format and display a table 240.

FIG. 7 illustrates the flexibility of the database module 127 and dynamic page generator 125 interaction. For example, suppose a merchant modifies the Product_table 220 (FIG. 6) to form a Revised_product_table 250. Note that the Revised_product_table 250 has the same information as the Product_table 220 (FIG. 6), but now includes an additional Description column 252. Using the template portion 200 (FIG. 6), the directive [fetchrows product "get-product"] 202 (FIG. 6) produces a product access object 260 from the Revised_product_table 250. Although the product access object 260 includes a column 262 with data corresponding to the Description column 252, the template portion 200 does not reference this column 262 for display. Referring back to FIG. 6, HTML commands 204 and the directives [eachrow product] 206, [value product.sku] 210, [money product.list_price] 212 and [/eachrow] 208 operating on the product access object 260 (FIG. 7) produce a HTML file portion to display table 240 on a browser 122, 123. Thus, the addition of a Description Column 252 to the Product_table 220 has no effect on the table 240 displayed on the browser 122, 123.

Referring back to FIG. 7, to include the information in the Description column 252 of the Revised_product_table 250, the template portion 200 (FIG. 6) is modified to form a revised template portion 270. Items in boldface type in the revised template portion 270 indicate modifications to the template portion 200 (FIG. 6) to display information from the Description column 252. As noted above, the product access object 260 already includes the information from the Description column 252. HTML command 272 instructs the browser to create and display a table having columns titled "Item", "Price" and "Description". As before, the directive [eachrow product] 274 instructs the dynamic page generator 125 to initiate a loop to iterate through the rows of the product access object 270, one row at a time and the directive [/eachrow] 276 denotes the end of an iteration of the loop. The directives [value product.sku] 278 and [money product.list_price] 280 evaluate their respective value references, format the values as needed and place them into the current page. Now, the directive [value product.description] 282 evaluates the product.description value reference to place information from the Description column 252 into the current page. At the completion of the [eachrow product] 274 directive, the dynamic page generator 125 passes a HTML file portion to the browser 122, 123 to format and display a table 284 having the Description column 252 information.

Figure 8:
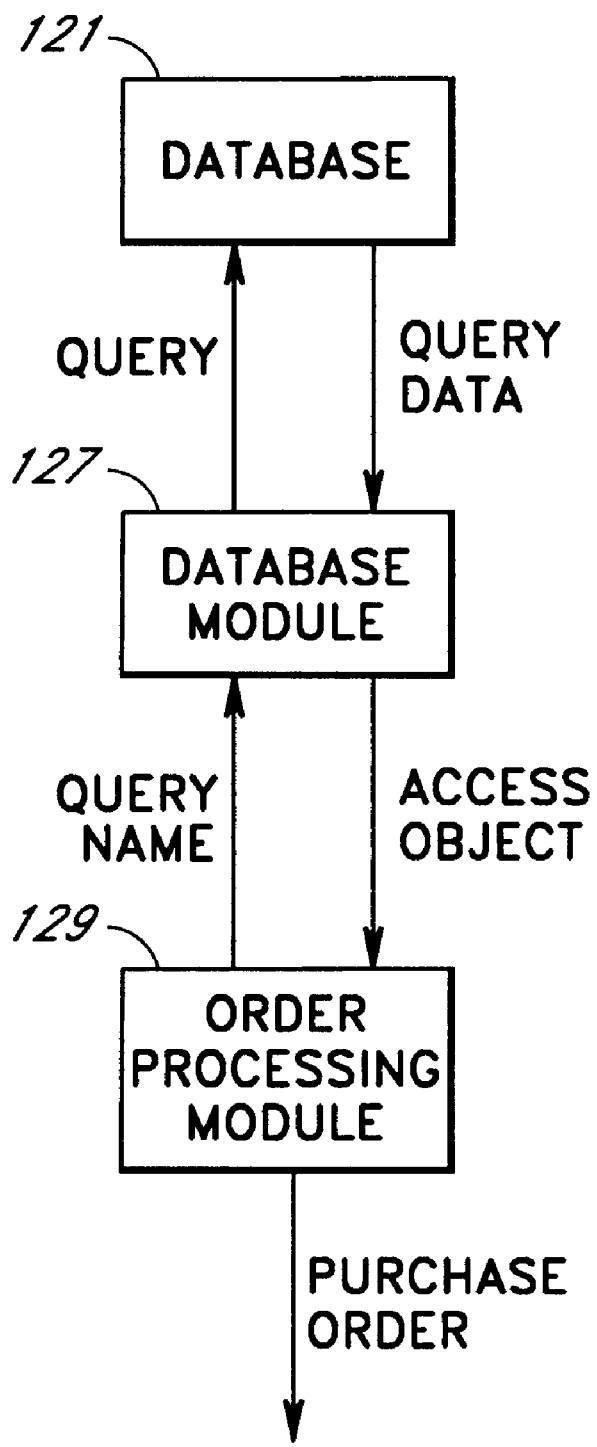
FIG. 8 illustrates the data flow for the database module and the order processing module shown in FIG. 2.

FIG. 8 illustrates the data flow for the database module 127 and the order processing module 129. The order processing module 129 of the merchant system 120 is configurable. As noted previously, merchants may customize the order processing module 129 by modifying, replacing or adding components 132 to the order pipeline 131 as needed to address their specific needs. Many of these components 132 access the database 121 for specific product information. In a manner similar to the dynamic page generator 125, the order processing module 129 provides a query name to the database module 127. The database module 127 uses the query name to retrieve the query from the database 121 and then passes the query to the database 121 for execution. The database 121 in turn executes the query and returns the query results to the database module 127 to produce an access object having the query results. The database module 127 returns the access object having the query results to the order processing module 129, which then processes the access object to extract and process desired query results to ultimately produce a purchase order. Note that the order processing module 129 is capable of providing purchase orders in a wide variety of formats, such as electronic mail, printed copy, electronic data interchange (EDI format as defined by ANSI X.12-850), a flat text file, a fax and a database table entry. Subsequently, the merchant fulfills the purchase order by obtaining payment from the shopper and delivering to the shopper the items paid for.

For example, if a shopper desires information on a product, the shopper selects the product using the consumer browser 122. The consumer browser 122 sends the product URL to the merchant system 120 where the order processing module 129 obtains and writes the product information in an order 300 as shown in FIG. 9. The order 300 includes an order blackboard 302 and an item blackboard 304. Note that the order blackboard 302 includes generic shopper information, such as the shopper's name and credit card number. To obtain product data, the order engine 130 invokes the product information stage of the order pipeline 131.

In a preferred embodiment, the product information default component of the components 132 (FIG. 2) accesses the key-value pair in the item blackboard 304 to create and execute the "one product" query. Thus, the product information default component retrieves the key, SKU, and the value, GLOVE, from the item blackboard 304 and passes this key-value pair and the query name "one-product" to the database module 127. The database module 127 retrieves SQL text corresponding to "one-product" and uses the key-value pair in the SQL text to form the SQL Query "SELECT * FROM Product_table WHERE SKU= 'GLOVE'". The database module 127 then passes this query to the database 121 having a Product_table 220 (FIG. 6). The database 121 executes the SQL query and returns the query results to the database module 127.

The database module 127 in turn forms an access object 310 including a row 312 having the query results and a descriptor 314 having the column names and corresponding data types from the Product_table 220 (FIG. 6). Afterwards, the database module 127 returns the access object 310 to the product information default component of the order processing module 129. The product information default component extracts product information from the row 312 (i.e., the name of the item, GLOVE, and its list price, 1225) and the column names 316 from the descriptor 314 (i.e., SKU and List_price). Lastly, the product information default component creates an annotated order 320 by adding the extracted information to the item blackboard 322. To do so, the product information default component first catenates the column names to the string "product_" and then forms key-value pairs, such as the product_SKU—GLOVE pair, for each column name and data value. Finally, the product information default component stores the key-value pairs formed in the item blackboard 322. Because the order processing module 129 accesses product information through a name corresponding to a SQL query stored in the database 121, differences in database schemas and data sublanguages do not affect the operation of the order processing module 129.

Figure 10:
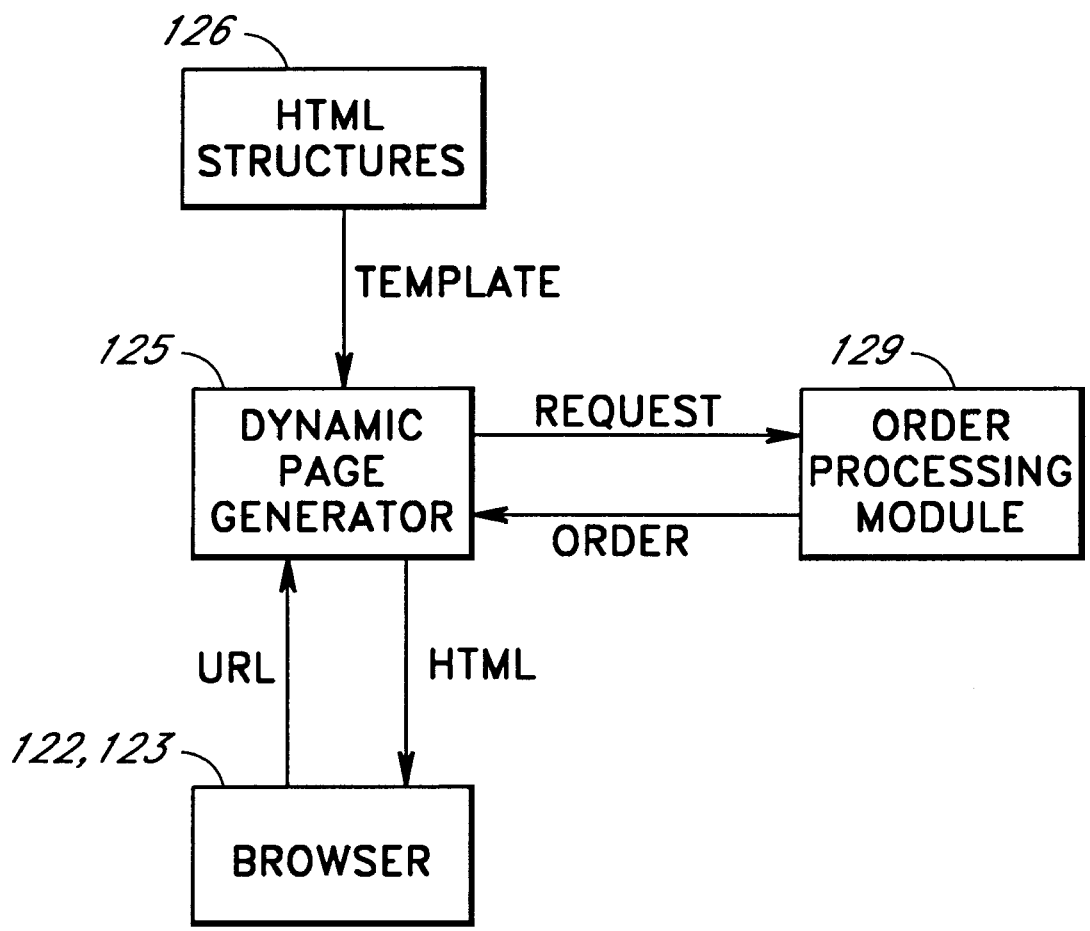
FIG. 10 illustrates the data flow for the dynamic page generator and the order processing module of FIG. 2.

FIG. 10 illustrates the data flow for the dynamic page generator 125 and the order processing module 129. For example, to view detailed information about an item, a shopper may select the image of an item, an item from a menu or an item from a list of items in a table in the browser 122. In a preferred embodiment, each image of an item includes a hyperlink specifying the item's URL. The browser 122 transmits the URL to the dynamic page generator 125. The dynamic page generator 125 in turn retrieves the product.html template from the HTML structures 126 to create a product HTML page for display on the shopper's browser 122. The template directs the dynamic page generator 125 to create an order for the selected item and to invoke the order processing module 129 to process the order for the selected item. In this manner, the dynamic page generator 125 makes a request for the order processing module 129 to process an order. Within the order processing module 129, the order engine 130 invokes the product information stage of the order pipeline 131 to perform a query that retrieves product information from the database 121 and then invokes the item price adjust stage of the order pipeline 131 to determine the regular and current prices of an item. The item price adjust stage includes a ItemPromo component, further described in a commonly owned and concurrently filed application having the title "Electronic Promotion System For An Electronic Merchant System", Ser. No. 08/732,195, hereby incorporated by reference. Upon completion of these stages, the order processing module 129 transfers the order back to the dynamic page generator 125. The dynamic page generator 125 combines the product information in the order with the product.html template to create a HTML page for display on the shopper's browser 122.

For example, a template portion 340 includes the HTML and directives shown in FIG. 11. The directive [fetchproduct product GLOVE] 342 instructs the page processor 140 of the dynamic page generator 125 to build an order 350 having an item blackboard 352 and to call the order processing module 129. The item blackboard 352 includes a SKU key-value pair 354 to denote the SKU that it represents. Upon creation of the order 350, the page processor 140 passes it to the order processing module 129. As discussed in FIG. 9, the order engine 130 invokes the product information stage of the order pipeline 131 to obtain the price of the product corresponding to the SKU in the item blackboard 352. As before, the product information default component uses the key-value pair 354 to form and execute a query on the database 121 resulting in the access object 310 (FIG. 9). Similarly, the product information default component extracts the product information from the access object 310 (FIG. 9) and stores the resulting key-value pairs 356 in the item blackboard 360 of a first annotated order 362. Now, the order engine 130 invokes the item price adjust stage of the order pipeline 131 to make any needed item price adjustments in the first annotated order 362. Because the ItemPromo component of the components 132 (FIG. 2) has been configured to apply 10% off of all items, it stores the "iadjust_currentprice" key-value pair on the item blackboard 372 of a second annotated order 374 to apply the 10% off promotion. When the ItemPromo component has completed posting the adjusted product price to the item blackboard 372, the order processing module 129 then returns the second annotated order 374 to the dynamic page generator 125.

The directive [money product.iadjust_currentprice] 344 instructs the page processor 140 to evaluate the value reference product.iadjust_currentprice and format the resulting value in a currency format on the shopper's browser. To do so, the page processor 140 obtains the value of the "iadjust_currentprice" key-value pair, 1102, from the item blackboard 372. The money directive instructs the page processor 140 to format the 1102 value as currency in the HTML sent to the browser 122 for display. Similarly, the directive [money product.product_List_price] instructs the page processor 140 to obtain the value of the "product_List_price" key-value pair, 1225, from the item blackboard 275 and to format the 1225 value as currency in the HTML sent to the browser 122 for display. Upon completion of the money directive 346, the page processor 140 sends the HTML resulting from these directives to the consumer browser 122 for display of the resulting page portion 380.

Figure 12:
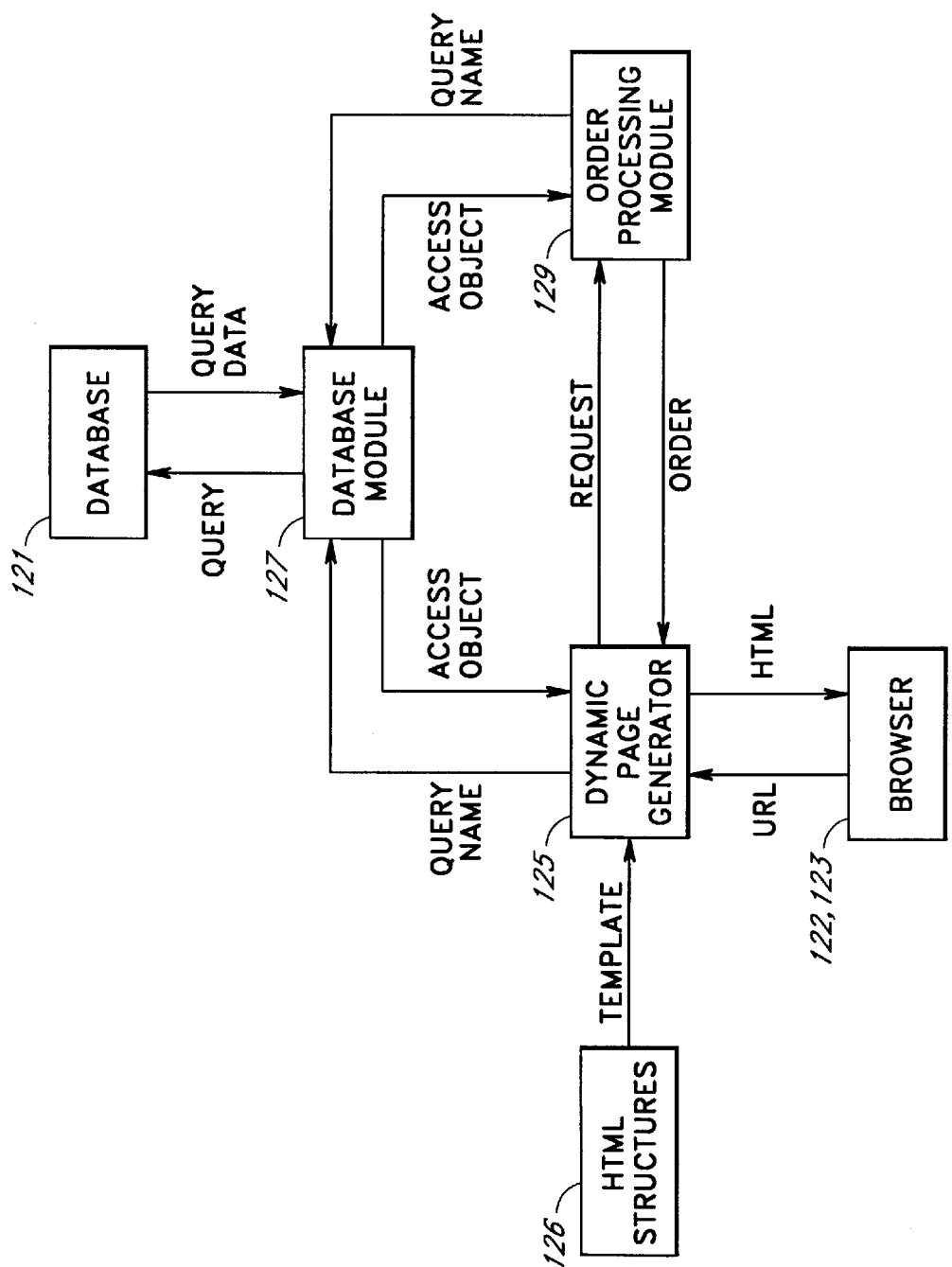
FIG. 12 illustrates the data flow for the dynamic page generator, the order processing module and the database module of FIG. 2.

FIG. 12 illustrates the data flow for the dynamic page generator 125, the database module 127 and the order processing module 129. For example, when a shopper uses a shopping basket, the browser 122 transmits the URL to the dynamic page generator 125 requesting a page for the shopping basket. The dynamic page generator 125 in turn retrieves the basket.html from the HTML structures 126 to create a HTML page for display on the shopper's browser 122. This template directs the order processing module 129 to provide an order for the selected item. The order processing module 129 accesses the database module 127 to obtain product information to prepare the order. Upon completion, the order processing module 129 transfers the order to the dynamic page generator 125. The dynamic page generator 125 uses the order with the basket.html template to compose a HTML page for display on the shopper's browser 122. In parsing the template file, the dynamic page generator 125 often needs to acquire additional product information from the database 121 using the database module. As previously described, the database module 127 accesses database queries by name and provides access objects having query results to the requesting application, such as the dynamic page generator 125 or the order processing module 129.

For example, FIG. 13a illustrates a template portion 400 from the basket.html template. As noted above, the shopper invokes the basket.html template by selecting a shopping basket button on the consumer browser 122. In response, the consumer browser 122 creates and transmits a URL to the merchant system 120 instructing the dynamic page generator 125 to retrieve and execute the basket.html template. Suppose the shopping basket includes the hat and glove shown in the Product_table 220 (FIG. 6). The directive [fetchitems orderitems order.items] 402 instructs the dynamic page generator 125 to retrieve and store data for all of the items in an order in a variable orderitems to provide for reference by subsequent directives in the template portion 400. To execute the directive, the dynamic page generator 125 first evaluates the value reference order.items. To determine the value of order.items, the dynamic page generator 125 invokes the order processing module 129 to obtain the order 420 corresponding to a shopping basket having a glove and a hat. The order 420 includes an order blackboard 422 having generic shopper information, such as the shopper's name and credit card number, an item blackboard 424 for the glove and an item blackboard 426 for the hat.

As described previously, the product information stage of the order pipeline 131 causes the product information default component to access product information from the database table Product_table 220 (FIG. 6) using the "one product" SQL query, "SELECT * FROM Product_table WHERE SKU='GLOVE'". As before, the database 121 returns the query results to the database module 127 to create and return an access object having the query results to the product information default component of the order processing module 129. The product information default component then extracts the product information from the access object and posts a key-value pair for the SKU 428 and for the List_price 430 in the glove item blackboard 424. In a similar manner, key-value pairs for the SKU 432 and List_price 434 are posted in the hat item blackboard 426.

Upon completion of the product information stage of the order pipeline 131, the order processing module 129 returns the order 420 to the dynamic page generator 125. In a presently preferred embodiment, the dynamic page generator 125 evaluates the value reference order.items and executes the fetchitems directive 402 by directly extracting values from the item blackboards 424, 426 of the order 420. However, for illustrative purposes, an access object 440 is used to describe the how the dynamic page generator 125 completes the remaining directives in template portion 400. The access object 440 corresponds to the order 420, and thus the variable orderitems, and includes a glove row 444 having glove information and a hat row 446 having hat information.

Referring back to the template portion 400, the directive [eachrow orderitems] 404 initiates a loop and instructs the dynamic page generator to iterate through the rows of orderitems 440 while the directive [/eachrow] 406 terminates the loop. The next directive [fetchrows crossinfo cross orderitems.sku] 408 instructs the dynamic page generator 125 to execute the query named "cross" using the argument orderitems.sku 410 and to place the query results in the variable crossinfo. The query "cross" corresponds to the SQL query "SELECT * FROM Cross_table WHERE SKU=:1". Note that the ":1" in the "cross" query serves as a placeholder for the value of the argument orderitems.sku 410 during each iteration of the eachrow loop. For example, for the first row 444 of access object 440, orderitems.sku evaluates to "GLOVE", so the first SQL query executed is "SELECT * FROM Cross_table WHERE SKU='GLOVE'". Referring now to FIG. 13b, the Cross_table 450 includes a single row having a cross sell product of a SCARF for a HAT. Thus, the first SQL query on the Cross_table 450 returns a first access object 460 having a descriptor 462, but no data as there are no entries in the Cross_table 450 corresponding to the SKU GLOVE. The first access object 460 corresponds to the variable crossinfo for the first interation of the eachrow loop.

The directive [if crossinfo.count>0] 412 implements a standard if-then-else statement. The dynamic page generator 125 evaluates the value reference crossinfo.count, where crossinfo.count evaluates to the number of rows in crossinfo, to perform the conditional test to determine if the value of crossinfo.count is greater than zero. If so, the dynamic page generator 125 performs the next line 414 in the template portion 400. Otherwise, the dynamic page generator 125 executes the else line 416. Thus, for the first iteration of the eachrow loop, the value of crossinfo.count is zero because the first access object 460 has no rows and the dynamic page generator 125 executes the else line 416. The else line 416 includes a directive [value orderitems.sku] 417. As noted above, orderitems.sku evaluates to GLOVE, so the dynamic page generator 125 sends HTML to the browser 122 where the first line 472 of a page portion 470 is displayed.

Similarly, for the second row 446 of access object 440, orderitems.sku evaluates to "HAT" and the second SQL query executes is "SELECT * FROM Cross_table WHERE SKU='HAT'". Thus, the second SQL query on the Cross_ table 450 returns a second access object 464 (FIG. 13b) having a descriptor 466 and a data row 468. Here, the second access object 464 corresponds to the variable crossinfo and crossinfo.count evaluates to one because the second access object 464 has one data row 468. Since one is greater than zero, the dynamic page generator 125 executes the next line 414, which has a directive [value orderitems.sku] 418 and a directive [value crossinfo.related] 419. Here, orderitems.sku evaluates to HAT. As the second access object 464 corresponds to crossinfo for this iteration, crossinfo.related evaluates to the value in the Related, or second column, in the data row 468, or SCARF. Thus, the dynamic page generator 125 sends HTML to the browser 122 to display a second line 474 of the page portion 470.

FIG. 14 illustrates the architecture and data flow for the merchant system 120. In a preferred embodiment, a shopper selects a button, link or image having a link in a page using a browser 122. By selecting the link, the browser 122 returns a URL to the merchant system 120. As described above, a URL with a reference to "pgen" invokes the dynamic page generator 125. The dynamic page generator 125 in turn retrieves a template, "template.html", from the HTML structures 126 and begins to compose a page for display on the browser 122. If the template requires data from the database 121, the dynamic page generator 125 passes a query name to the database module 127, which returns an access object having the query results. Similarly, if the template requires order information from the order processing module 129, the dynamic page generator 125 retrieves an order from the order processing module 129 and extracts the desired order information for display. Lastly, the dynamic page generator 125 assimilates all of the information needed by the template to produce a HTML page for transfer to the browser 122 for display.

In a similar manner, a URL with a reference to "xt" invokes the action manager 128. The action manager 128 executes the action specified by the "module.action" portion of the URL. To do so, the action manager 128 evaluates any arguments provided by the URL and passes them to the action. Actions may communicate directly with the database module 127 to write data, such as orders, shopper information, product information and other information needed to run and manage the merchant system 120, into the database 121. Actions also communicate with the order processing module 129 as needed to process an order. An action may retrieve an order from the database 121 and then pass the order to the order processing module 129 for annotation. During the annotation of the order, the order processing module 129 interacts with the database module 127 as needed to retrieve product information for the key-value pairs in the blackboards comprising the order. The annotated order is subsequently delivered to the dynamic page generator 125 to extract information from the order needed in a template to prepare a page for display on a consumer browser 122. In some circumstances, the action manager 128 sends the browser 122, 123 a redirect instruction causing the display of a selected page. This occurs because a reloading of the page from which the shopper initiated the action will invoke the action again, which may be undesirable for certain actions.

For example, FIG. 15a illustrates a sample pseudo code portion 500 for the order.plan action. In a preferred embodiment, the consumer browser 122, in response to a shopper selecting the proper button, link or image having a link on a page, prepares and sends the URL "http://sample/prd.i/xt/test_store/shopperid/order.plan; billto_zip=92101" to the merchant system 120. The merchant system 120 evaluates the URL to determine that a shopper identified as "shopperid" desires the "test_store" running on the "sample" server to invoke "xt", the action manager 128, to execute the order.plan action using the argument "billto_zip=92101". Thus, the action manager 128 invokes the order.plan action and begins to execute the pseudo code portion 500. The assignment statement 502 instructs the action manager 128 to extract the shopper identifier from the URL, "shopperid", to pass as a parameter to the "load_order" function. The "load_order" function retrieves an order 300 (FIG. 9) from the database 121 corresponding to the shopper having a shopper identifier "shopperid" and places the order 300 (FIG. 9) in a variable order for future reference in the pseudo code portion 500. Note that the order 300 (FIG. 9) includes an order blackboard 302 (FIG. 9) and an item blackboard 304 (FIG. 9). The add statement 504 instructs the action manager 128 to post the arguments received from the URL to the order blackboard 302 (FIG. 9) as a key-value pair. As noted above, the URL has provided the argument "billto_zip=92101". Thus, the action manager 128 posts the URL argument as a key-value pair to the order blackboard 302 (FIG. 2) resulting in the revised order 520. Note that the revised order 520 includes a revised order blackboard 522 having the Billto_zip key-value pair 526 and an unchanged item blackboard 524.

Referring back to the pseudo code portion 500, the OPM instruction 506 invokes the order processing module 129 to execute the OPM.plan function. The OPM.plan function receives the revised order 520 as the order parameter and causes the order engine 130 to invoke the pertinent stages of the order pipeline 131 to process the revised order 520. For example, suppose the pertinent stages of the order pipeline 131 are the product information stage, the item price adjust stage, the order price adjust stage, the shipping stage, the tax stage and the order total stage. As discussed previously, the product information default component of the product information stage retrieves the key-value pair, SKU—GLOVE, from the item blackboard 304 (FIG. 9) and passes a query name to the database module 127 to create and execute the SQL Query "SELECT * FROM Product_table WHERE SKU='GLOVE'" on the database 121. Upon execution of the SQL query, the database module 127 returns an access object 310 (FIG. 9) having product information in the row 312 and the column names 316 in the descriptor 314. The product information default component extracts the SKU key from the column names 316 and its associated value GLOVE from the row 312 to form the SKU key-value pair 540 in the annotated item blackboard 542 of the annotated order 544. Note that the product information default component catenates SKU to the string "_product_" to form the key "_product_SKU".

In a presently preferred embodiment, the leading "_" portion of "_Product_" indicates that this key value pair is temporary and will not be saved with the order. The "product_" portion of "_product_" indicates the stage that posted the key value pair, or the product information stage. Similarly, the product information default component extracts the remaining product information from the access object 310 (FIG. 9) and posts the List_price key value pair 546. In a similar fashion, the item price adjust stage invokes a promotion component to post the promotion key-value pair 548 and the order price adjust stage invokes a component to post the adjusted price key-value pair 550. In addition, the shipping stage invokes the default component to post a shipping key-value pair in the annotated order blackboard 554. Likewise, the tax stage invokes an optional 7% tax component to post the tax key-value pair 556 and the order total stage invokes a component to sum the values and post the total key-value pair 558 to the annotated order blackboard 554. The OPM.plan function terminates without an error.

Referring back to the pseudo code portion 500, the if statement 508 instructs the action manager 128 to evaluate the condition order.error. As the OPM.plan function terminated without an error, the order.error condition is false, so the action manager 128 proceeds to the redirect statement 510 of the else branch. The redirect statement 510 instructs the action manager 128 to send a redirect instruction to the browser to invoke the dynamic page generator 125 to execute the basket.html template. Lastly, the action manager 128 performs the "save_order(order)" instruction, saving all key-value pairs, except those beginning with an underscore. The resulting saved order looks like the revised order 520.

FIG. 15b illustrates a template portion 570 from the basket.html template. Suppose the shopping basket includes the glove shown in the Product_table 220 (FIG. 6). The directive [fetchitems orderitems order.items] 572 instructs the dynamic page generator 125 to retrieve and store data for all of the items in an order in a variable orderitems to provide for reference by subsequent directives in the template portion 570. To execute the directive, the dynamic page generator 125 first evaluates the value reference order.items. To determine the value of order.items, the dynamic page generator 125 invokes the order processing module 129 to obtain the order 520 (FIG. 15a) corresponding to a shopping basket having a glove. The order 520 includes an order blackboard 522 (FIG. 15a) having generic shopper information, such as the shopper's name and credit card number, and an item blackboard 524 (FIG. 15a) for the glove.

As described previously, the product information stage of the order pipeline 131 causes the product information default component to access product information from the database table Product_table 220 (FIG. 6) using the "one product" SQL query, "SELECT * FROM Product_table WHERE SKU='GLOVE'". As before, the database 121 returns the query results to the database module 127 to create and return an access object having the query results to the product information default component of the order processing module 129. The product information default component then extracts the product information from the access object and posts a key-value pair for the SKU 600 and for the List_price 602 in the modified item blackboard 604 of the modified order 606.

Upon completion of the product information stage of the order pipeline 131, the order processing module 129 returns the modified order 606 to the dynamic page generator 125. In a presently preferred embodiment, the dynamic page generator 125 evaluates the value reference order.items and executes the fetchitems directive 572 by directly extracting values from the modified item blackboard 604 of the modified order 606. However, for illustrative purposes, an access object 610 is used to describe the how the dynamic page generator 125 completes the remaining directives in template portion 570. The access object 610 corresponds to the modified order 606, and thus the variable orderitems, and includes a glove row 612 having glove information.

Referring back to the template portion 570, the directive [eachrow orderitems] 574 initiates a loop and instructs the dynamic page generator to iterate through the rows of orderitems access object 610 while the directive [/eachrow] 576 terminates the loop. The next directive [fetchrows crossinfo cross orderitems.sku] 578 instructs the dynamic page generator 125 to execute the query named "cross" using the argument orderitems.sku 580 and to place the query results in the variable crossinfo. The query "cross" corresponds to the SQL query "SELECT * FROM Cross_table WHERE SKU=:1". Note that the ":1" in the "cross" query serves as a placeholder for the value of the argument orderitems.sku 580 during each iteration of the eachrow loop. For example, for the row 612 of access object 610, orderitems.sku evaluates to "GLOVE", so the SQL query executed is "SELECT * FROM Cross_table WHERE SKU='GLOVE'".

Referring now to FIG. 13b, the Cross_table 450 includes a single row having a cross sell product of a SCARF for a HAT. Thus, the first SQL query on the Cross_table 450 returns a first access object 460 having a descriptor 462, but no data as there are no entries in the Cross_table 450 corresponding to the SKU GLOVE. The first access object 460 corresponds to the variable crossinfo for the first interation of the eachrow loop. The directive [if crossinfo.count >0] 582 implements a standard if-then-else statement. The dynamic page generator 125 evaluates the value reference crossinfo.count, where crossinfo.count evaluates to the number of rows in crossinfo, to perform the conditional test to determine if the value of crossinfo.count is greater than zero. If so, the dynamic page generator 125 performs the next line 584 in the template portion 570. Otherwise, the dynamic page generator 125 executes the else line 586.

Thus, for the first iteration of the eachrow loop, the value of crossinfo.count is zero because the first access object 460 has no rows and the dynamic page generator 125 executes the else line 586. The else line 586 includes a directive [value orderitems.sku] 587. As noted above, orderitems.sku evaluates to GLOVE, so the dynamic page generator 125 sends HTML to the browser 122 where the first line 622 of a page portion 620 is displayed. As the access object 610 has only a single row, the loop terminates and the dynamic page generator 125 proceeds to the final line 588. The directive [value order.billto_zip] 589 instructs the dynamic page generator 125 to evaluate the value of order.billto_zip. To do so, the dynamic page generator 125 extracts the value "92101" using the key "billto_zip" directly from the order blackboard 608 of the modified order 606. Lastly, the dynamic page generator 125 incorporates the "92101" value into the HTML sent to the browser 122, 123 to display the second line 624 of the page portion 620.

The present invention advantageously overcomes several limitations of existing technologies and alternatives. Existing merchant systems, such as eShop 1.0 and Netscape Merchant System, display only a limited subset of information from their product databases in rigid display formats. If a merchant desires to change the display format, the merchant has to revise the system modules producing the display formats. In contrast to these systems, the present invention permits the display of data retrieved from a wide variety of database sources having a wide variety of schemas. Likewise, the present invention permits the display of data in any format or presentation desired by the merchant. The present invention provides this flexibility through the use of display templates and a database schema independent query mechanism. In this manner, a merchant handles a database schema modification by changing the database queries stored in the database instead of modifying the system modules that perform database queries. Thus, a merchant can modify its database schema without affecting the performance of the merchant system. Similarly, a merchant can change the display format by modifying the template, rather than the system modules producing the display formats. Moreover, dynamic page generation is not limited to online merchant systems and the creation of HTML pages using directives. The dynamic page generator of the present invention is useful for any applications that create documents for visual display or electronic transmittal or storage incorporating information from one or more data sources. Thus, the present invention is applicable to mail merge operations for the preparation of form letters, the creation and publication of billing statements and purchase orders and the dynamic construction of electronic mail.

Similarly, because of the database schema independence, the order processing module of the present invention does not require modification for each change to the database schema. In contrast to existing merchant systems that require a fixed, predefined database schema, database schema knowledge in the present invention is embedded in the data queries stored in the database. Thus, the components of the order processing module do not require modification to process an order if the merchant modifies or restructures the product information in the database. Moreover, the present invention is applicable to electronic transaction processing systems, such as batch processing of billing statements, subscriptions and telephonic order systems.

In addition, existing merchant systems separate display operations from order processing operations. For example, eShop 1.0 and Netscape Merchant System do not permit price adjustments during order processing. Thus, a shopper using these merchant systems is not able to view information regarding sales taxes, shipping or other associated costs with the order. These merchant systems severely restricted a merchant's ability to promote their products to shoppers. In contrast to these restrictive designs, the present invention provides the capability to generate product information pages dynamically during order processing. Thus, a shopper using the present invention may view tax, shipping, handling and special merchant promotion information during order processing. Moreover, the calculations used to display product information are the same as the calculations used to process the order in the present invention. Thus, the present invention guarantees a shopper consistency and reliability in the information used to make purchasing decisions. In this context, the present invention has applicability to customer service operations regarding billings. Thus, customer service representatives at phone centers can use the present invention to compute and display customer billing information in real time as needed to assist their customers. Similarly, merchants can use the present invention in their point of sale systems, such as electronic cash registers, to obtain and process customer information.

Lastly, the present invention provides the ability to obtain a rich set of dynamically generated information from a wide variety of data sources. The present invention also provides the capability to perform a large set of processing operations and computations on the information prior to displaying the information. In contrast to existing systems, the present invention eliminates the restrictions of fixed, predefined database schemas, fixed order processing steps and computations and relatively inflexible display mechanisms. The utility of this combination of features is widely applicable to interactive transaction processing applications.

Those skilled in the art may practice the principles of the present invention in other specific forms without departing from its spirit or essential characteristics. Accordingly, the disclosed embodiments of the invention are merely illustrative and do not serve to limit the scope of the invention set forth in the following claims.

What is claimed is:

1. A merchant system, comprising:
   a dynamic page generator to compose a page for display by processing a template having a database request for page data, wherein the database request is a query name; and
   a database module, in communication with a database and with the dynamic page generator, to retrieve page data from the database and to communicate the page data to the dynamic page generator, wherein the retrieved page data corresponds to a query stored in the database, wherein said query corresponds to said query name, and wherein the database module retrieves the data in a manner that is independent of any database schema.

2. The merchant system of claim 1, wherein the database is defined by a single schema.

3. The merchant system of claim 1, wherein the database is defined by a plurality of schemas.

4. The merchant system of claim 1, wherein the query is a SQL query.

5. The merchant system of claim 1, wherein the database module returns an access object having the page data to the dynamic page generator.

6. The merchant system of claim 1, wherein the template includes HTML and directives.

7. The merchant system of claim 6, wherein the directive is a keyword specifying how to build the page for display.

8. The merchant system of claim 1, further comprising HTML structures in communication with the dynamic page generator.

9. The merchant system of claim 8, wherein the HTML structures include a plurality of templates.

10. The merchant system of claim 8, wherein the HTML structures include a plurality of HTML pages.

11. The merchant system of claim 8, further comprising a browser in communication with the dynamic page generator.

12. The merchant system of claim 11, wherein the browser sends a URL to the dynamic page generator indicating the template to display.

13. The merchant system of claim 11, wherein the dynamic page generator sends to the browser HTML resulting from the processing of the template.

14. The merchant system of claim 1, further comprising a browser in communication with the dynamic page generator.

15. The merchant system of claim 14, wherein the browser sends a URL to the dynamic page generator indicating the template to display.

16. The merchant system of claim 15, wherein the dynamic page generator sends to the browser HTML resulting from the processing of the template.

17. A merchant system, comprising:
   an order processing module, which makes a request for order data using a query name; and
   a database module, in communication with a database and with the order processing module, to retrieve the order data from the database and to communicate the order data to the order processing module, wherein the retrieved order data corresponds to a query stored in the database, wherein said query corresponds to said query name, and wherein the database module retrieves the data in a manner that is independent of any database schema.

18. The merchant system of claim 17, wherein the database is defined by a single schema.

19. The merchant system of claim 17, wherein the database is defined by a plurality of schemas.

20. The merchant system of claim 17, wherein the guery is a SQL query.

21. The merchant system of claim 17, wherein the database module returns an access object having the order data to the order processing module.

22. The merchant system of claim 17, wherein the order processing module comprises,
an order pipeline having multiple stages, wherein each stage includes a plurality of components configured to process the order, and
an order engine to determine which stages of the order pipeline to execute in order to process the order.

23. The merchant system of claim 22, wherein the sequence of execution of the stages in the order pipeline is configurable.

24. The merchant system of claim 22, wherein the components within each stage are configurable.

25. The merchant system of claim 17, wherein the order comprises an order blackboard having key-value pairs.

26. The merchant system of claim 25, wherein the order further comprises an item blackboard having key-value pairs.

27. The merchant system of claim 26, wherein the component posts a portion of the order data retrieved from the database to the item blackboard in a key-value pair.

28. The merchant system of claim 25, wherein the component posts a portion of the order data retrieved from the database to the order blackboard in a key-value pair.

29. A merchant system, comprising:
an order processing module having a plurality of components configured to create and process an order, wherein a component makes a component request for order data;
a dynamic page generator, in communication with the order processing module, to compose a page for display by processing a template having a request for information from the order and a database request for page data, wherein the request for page data is a query name; and
a database module, incommunication with a database and with the order processing module and with the dynamic page generator, to retrieve order data from the database and to communicate the order data to the order processing module and to retrieve page data from the database and to communicate the page data to the dynamic page generator, wherein the retrieved order data corresponds to a query stored in the database, wherein said query corresponds to said query name, and the database module retrieves the order and page data in a manner that is independent of any database schema.

30. The merchant system of claim 29, wherein the template includes HTML and directives.

31. The merchant system of claim 30, wherein the directive is a keyword specifying how to build the page for display.

32. The merchant system of claim 29, further comprising HTML structures in communication with the dynamic page generator.

33. The merchant system of claim 32, wherein the HTML structures include a plurality of templates.

34. The merchant system of claim 32, wherein the HTML structures include a plurality of HTML pages.

35. The merchant system of claim 32, further comprising a browser in communication with the dynamic page generator.

36. The merchant system of claim 35, wherein the browser sends a URL to the dynamic page generator indicating the template to display.

37. The merchant system of claim 35, wherein the dynamic page generator sends to the browser HTML resulting from the processing of the template.

38. The merchant system of claim 29, further comprising a browser in communication with the dynamic page generator.

39. The merchant system of claim 38, wherein the browser sends a URL to the dynamic page generator indicating the template to display.

40. The merchant system of claim 38, wherein the dynamic page generator sends to the browser HTML resulting from the processing of the template.

41. The merchant system of claim 38, further comprising an action manager in communication with the browser, the order processing unit and the database module.

42. The merchant system of claim 41, wherein the browser sends a URL to the action manager indicating an action to perform.

43. The merchant system of claim 41, wherein the action manager redirects the browser to display a selected page.

44. The merchant system of claim 41, wherein the action manager retrieves data from the database.

45. The merchant system of claim 41, wherein the action manager saves data to the database.

46. The merchant system of claim 41, wherein the action manager creates a new order having an order blackboard and posts a key-value pair to the order blackboard.

47. The merchant system of claim 41, wherein the action manager retrieves the order having an order blackboard from the database module and posts a key-value pair to the order blackboard.

48. The merchant system of claim 41, wherein the action manager retrieves the order having an item blackboard from the database module and posts a key-value pair to the item blackboard.

49. The merchant system of claim 29, wherein the order processing module comprises,
an order pipeline having multiple stages, wherein each stage includes a plurality of components configured to process the order, and
an order engine to determine which stages of the order pipeline to execute in order to process the order.

50. The merchant system of claim 49, wherein the sequence of execution of the stages in the order pipeline is configurable.

51. The merchant system of claim 49, wherein the components within each stage are configurable.

52. The merchant system of claim 29, wherein the order comprises an order blackboard having key-value pairs.

53. The merchant system of claim 52, wherein the order further comprises an item blackboard having key-value pairs.

54. The merchant system of claim 53, wherein the component posts a portion of the data retrieved from the database to the item blackboard in a key-value pair.

55. The merchant system of claim 52, wherein the dynamic page generator extracts the information from the order using a key from a key-value pair.

56. The merchant system of claim 52, wherein the component posts a portion of the data retrieved from the database to the order blackboard in a key-value pair.

57. The merchant system of claim 29, wherein the database is defined by a single schema.

58. The merchant system of claim 29, wherein the database is defined by a plurality of schemas.

59. The merchant system of claim 29, wherein the query is a SQL query.

60. The merchant system of claim 29, wherein the component request is a component query name.

61. The merchant system of claim 60, wherein the database module uses the component query name to retrieve a corresponding SQL query.

62. The merchant system of claim 29, wherein the component request is stored in the database.

63. The merchant system of claim 29, wherein the database module returns an access object having the page data to the dynamic page generator.

64. The merchant system of claim 29, wherein the database module returns an access object having the order data to the dynamic page generator.

* * * * *